US012650516B2

(12) United States Patent (10) Patent No.: US 12,650,516 B2
Toyota et al. (45) Date of Patent: Jun. 9, 2026

(54) LIDAR DEVICE

(71) Applicant: DENSO CORPORATION, Kariya-city (JP)

(72) Inventors: Yuichi Toyota, Kariya-city (JP); Taro Beppu, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 718 days.

(21) Appl. No.: 18/187,527

(22) Filed: Mar. 21, 2023

(65) Prior Publication Data

US 2023/0221444 A1 Jul. 13, 2023

Related U.S. Application Data

(63) Continuation of application No. PCT/JP2021/034855, filed on Sep. 22, 2021.

(30) Foreign Application Priority Data

Sep. 23, 2020 (JP) ................................. 2020-158544

(51) Int. Cl.
| | |
|---|---|
| *G01S 17/931* | (2020.01) |
| *G01S 7/481* | (2006.01) |
| *G01S 7/4913* | (2020.01) |
| *G01S 17/32* | (2020.01) |

(52) U.S. Cl.
CPC .......... *G01S 17/931* (2020.01); *G01S 7/4817* (2013.01); *G01S 7/4913* (2013.01); *G01S 17/32* (2013.01)

(58) Field of Classification Search
CPC .... G01S 17/931; G01S 7/4817; G01S 7/4913; G01S 17/32; G01S 17/58; G01S 17/42; G01S 17/34; G01S 17/66; G01C 3/06
See application file for complete search history.

(56) References Cited

U.S. PATENT DOCUMENTS

| | | | |
|---|---|---|---|
| 2006/0244978 A1 | 11/2006 | Yamada et al. | |
| 2013/0342822 A1* | 12/2013 | Shiraishi ............... | G01S 7/4817 |
| | | | 356/4.01 |
| 2017/0356983 A1* | 12/2017 | Jeong .................... | G01S 7/4818 |

(Continued)

FOREIGN PATENT DOCUMENTS

| | | |
|---|---|---|
| DE | 10 2015 109 160 A1 | 12/2016 |
| JP | 2017150902 A | 8/2017 |

*Primary Examiner* — Md Saiful A Siddiqui
(74) *Attorney, Agent, or Firm* — Precision Patents, P.C.

(57) ABSTRACT

A LIDAR device performs an emission process of emitting the laser light to surroundings of a vehicle. The emission process includes a scanning process and a resolution adjustment process. The scanning process includes a process of scanning with the laser light a predefined direction that is one of vertical and horizontal directions. A plurality of emission directions include, as four directions, a first direction and a second direction adjacent to each other in the predefined direction, and a third direction and a fourth direction adjacent to each other in the predefined direction. The resolution adjustment process includes a process of making an angle difference between the third and fourth directions less than an angle difference between the first and second directions, and a variably setting process of variably setting the angle difference between the third and fourth directions according to a state variable of the vehicle, as an input.

15 Claims, 17 Drawing Sheets

(56) References Cited

U.S. PATENT DOCUMENTS

| | | |
|---|---|---|
| 2018/0136331 A1 | 5/2018 | Rosenzweig et al. |
| 2019/0011538 A1 | 1/2019 | Schwarz et al. |
| 2019/0086550 A1 | 3/2019 | Dussan et al. |
| 2019/0107607 A1 | 4/2019 | Danziger |
| 2019/0179024 A1 | 6/2019 | Englard et al. |
| 2022/0075034 A1* | 3/2022 | Kim ........................ G01S 7/484 |
| 2023/0074028 A1* | 3/2023 | Takagi .............. B60W 30/0956 |

* cited by examiner

FIG.3

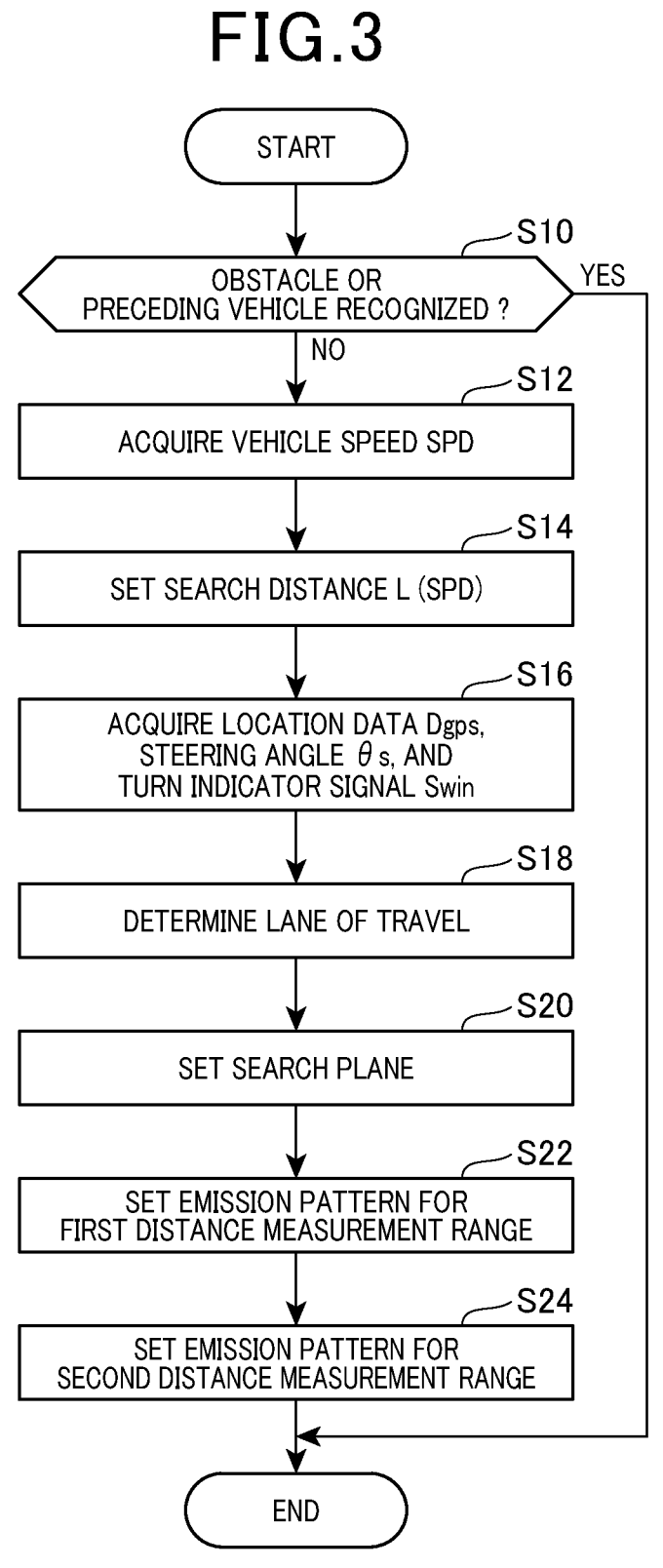

START

S10
OBSTACLE OR
PRECEDING VEHICLE RECOGNIZED ?
YES

NO

S12
ACQUIRE VEHICLE SPEED SPD

S14
SET SEARCH DISTANCE L (SPD)

S16
ACQUIRE LOCATION DATA Dgps,
STEERING ANGLE $\theta$s, AND
TURN INDICATOR SIGNAL Swin

S18
DETERMINE LANE OF TRAVEL

S20
SET SEARCH PLANE

S22
SET EMISSION PATTERN FOR
FIRST DISTANCE MEASUREMENT RANGE

S24
SET EMISSION PATTERN FOR
SECOND DISTANCE MEASUREMENT RANGE

END

START

ACQUIRE RANGE POINT CLOUD DATA — S30

PERFORM CLUSTERING PROCESS — S32

IS THERE LOW-PROFILE OBJECT ? — S34
NO / YES

F=1 ? — S35
NO / YES

DETECTED PREDEFINED NUMBER OF TIMES ? — S37
NO / YES

LOW-PROFILE OBJECT TRACKING MODE F←1 — S36

PERFORM NOTIFICATION PROCESS — S38

END

START

IS THERE NOTIFICATION OF PRESENCE OF LOW-PROFILE OBJECT ? — S40
NO / YES

PERFORM NOTIFICATION PROCESS — S42

END

FIG.12A

SPD: HIGH

FREQUENCY $f0$ $f\delta + \Delta f$ $Ts$

FIG.12B

SPD: LOW

FREQUENCY $f0$ $f\delta + \Delta f$ $Ts$ $x = y = z = \Delta H$ $\varepsilon > \alpha > \beta > \gamma$

LIDAR DEVICE

CROSS-REFERENCE TO RELATED APPLICATION

This application is a continuation application of International Application No. PCT/JP2021/034855 filed Sep. 22, 2021 which designated the U.S. and claims priority to Japanese Patent Application No. 2020-158544 filed Sep. 23, 2020, the contents of each of which are incorporated herein by reference.

BACKGROUND

Technical Field

This disclosure relates to a LIDAR device.

Related Art

A Light Detection and Ranging (LIDAR) device is known that can change emission directions of laser light.

BRIEF DESCRIPTION OF THE DRAWINGS

In the accompanying drawings:

FIG. 3 is a flowchart of a process performed by a LIDAR ECU according the first embodiment;

FIG. 12A is a timing chart illustrating a sampling timing setting process when the vehicle speed SPD is high according the second embodiment;

FIG. 12B is a timing chart illustrating a sampling timing setting process when the vehicle speed SPD is low according the second embodiment;

DESCRIPTION OF SPECIFIC EMBODIMENTS

Figure 1:
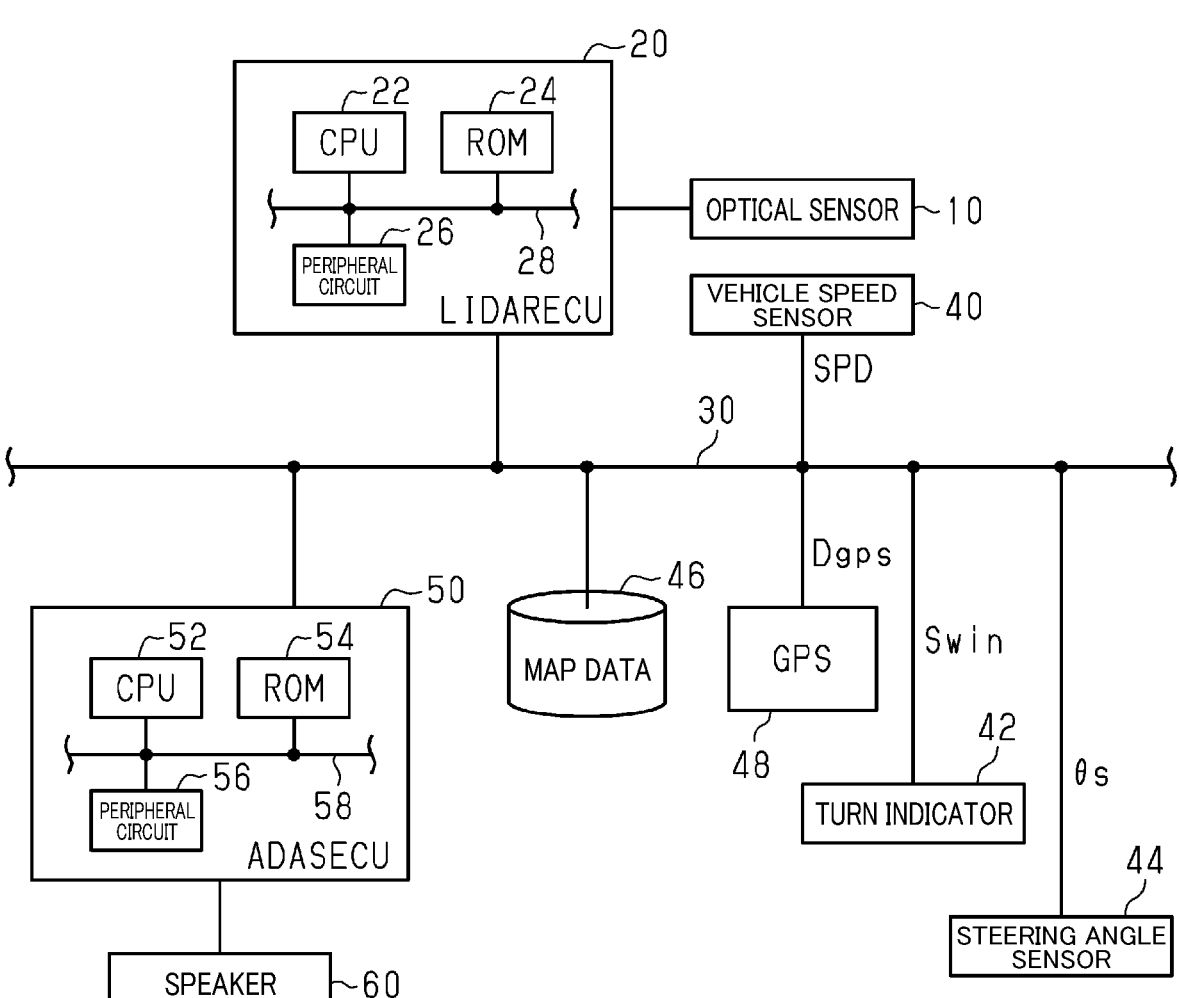
FIG. 1 is a diagram illustrating a configuration of an on-board system according to a first embodiment.

The above known LIDAR device, as disclosed in US 2017/0356983, is configured to switch between an emission pattern in which laser light is emitted far, but the emission angle in the direction perpendicular to the road surface is small, and an emission pattern in which laser light is emitted near, but the emission angle in the direction perpendicular to the road surface is large (see FIG. 1B of US 2017/0356983). Among actual scenes that can occur during travel of a vehicle, there may be some scenes where the required resolution is particularly high in a specific region. In such cases, if the emission density of laser light is the same in all emission directions, the emission density of laser light may be higher than the required resolution in regions other than the specific region.

One aspect of the present disclosure provides a LIDAR device that receives reflected light of laser light emitted to surroundings of a vehicle. The LIDAR device is configured to perform an emission process of emitting the laser light to the surroundings of the vehicle. The emission process includes a scanning process of scanning a plurality of emission directions of the laser light and a resolution adjustment process. The scanning process includes a process of scanning with the laser light a predefined direction that is one of vertical and horizontal directions. The plurality of emission directions include, as four directions, a first direction and a second direction which are adjacent to each other in the predefined direction, and a third direction and a fourth direction adjacent to each other in the predefined direction. The resolution adjustment process includes a process of making an angle difference between the third and fourth directions less than an angle difference between the first and second directions, and a variably setting process of variably setting the angle difference between the third and fourth directions according to a state variable indicating a state of the vehicle, as an input.

According to the above resolution adjustment process, the emission density of laser light in or near the third direction can be increased as compared to in or near the first direction. Aligning the third direction with the direction in which high resolution is required can provide the required resolution or resolution requirement without increasing the number of emissions of the laser light. Note that the minimum emission density of laser light that meets the required resolution tends to depend on a state of the vehicle, such as a vehicle speed and a distance between a target region and the vehicle. Therefore, as configured as above, variably setting the angle difference between the third and fourth directions according to the state of the vehicle allows the required resolution to be met with the least increased number of emissions of the laser light.

For the purposes of the description, it is to be understood that a phrase in the form "at least one of A and B" means "only A, or only B, or both A and B".

First Embodiment

A LIDAR device according to a first embodiment will now be described with reference to the accompanying drawings.

An optical sensor 10 illustrated in FIG. 1 emits laser light, such as near-infrared light or the like. Based on reception of reflected laser light, the optical sensor 10 generates range point data that indicates a distance variable, which is a variable indicating a distance between the vehicle and an object reflecting the laser light, a speed variable, which is a variable indicating a relative speed between the vehicle and the object reflecting the laser light, a direction variable, which is a variable indicating an emission direction of the laser light, and an intensity variable, which is a variable indicating the reflection intensity of the object reflecting the laser light. The reason why the range point data includes the speed variable is that the optical sensor 10 according to the present embodiment is configured to generate the range point data in the Frequency Modulated Continuous Wave (FMCW) scheme.

Specifically, the optical sensor 10 according to the present embodiment is a phased-array sensor that includes a plurality of light-emitting elements and adjusts the emission direction of the laser light by adjusting the phase of the light emitted from the plurality of light-emitting elements.

Figures 2A, 2B:
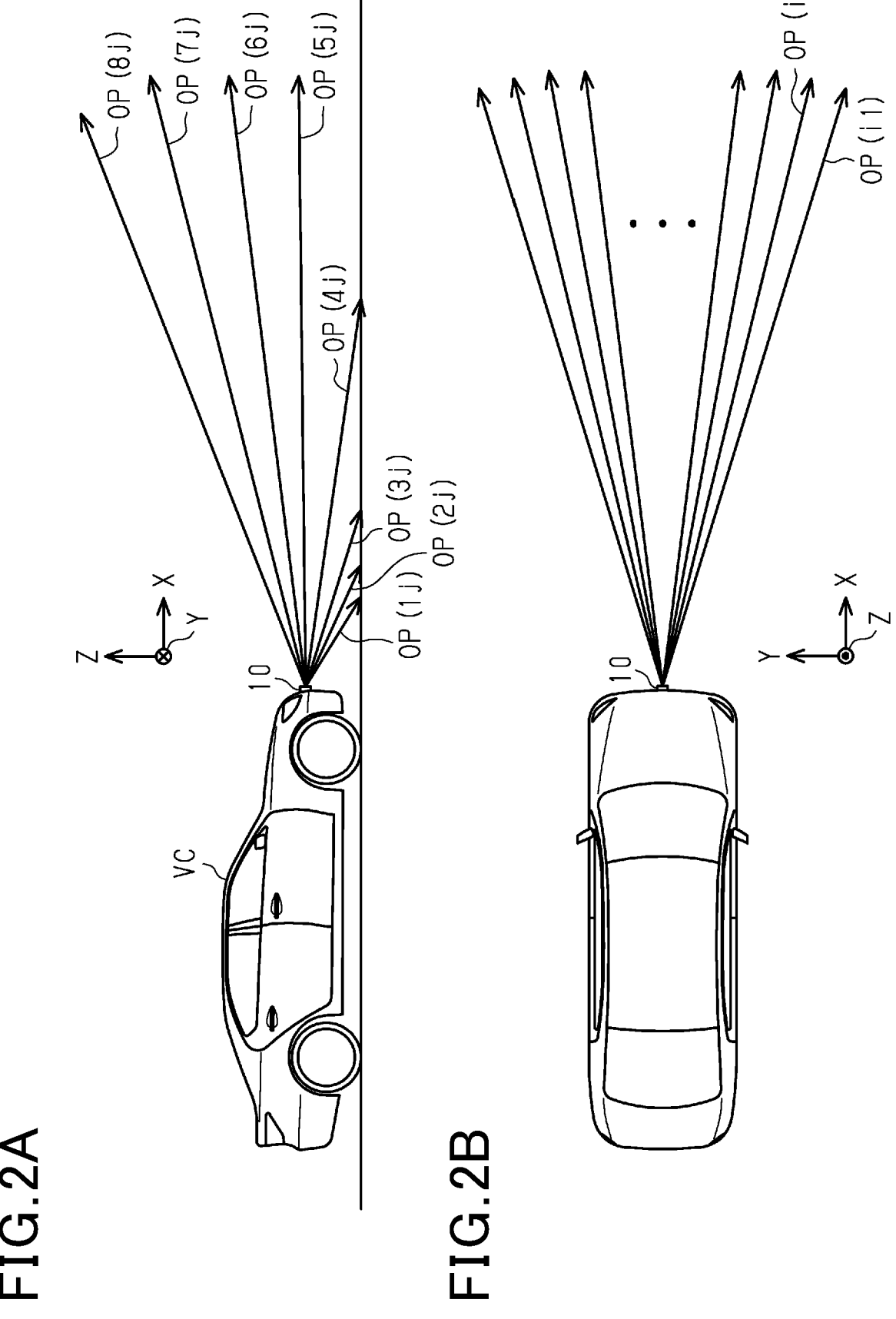
FIG. 2A is an illustration of a vertical scanning process.
FIG. 2B is an illustration of a horizontal scanning process.

As illustrated in FIG. 2, the optical sensor 10 according to the present embodiment is installed at the front end of the vehicle VC. The optical sensor 10 performs a horizontal scanning process and a vertical scanning process by adjusting the phase of light emitted from the plurality of light-emitting elements. The vertical scanning process is a process of scanning angles between a z-direction, which is a direction perpendicular to an x-direction (longitudinal direction of the vehicle VC) and a y-direction (lateral direction of the vehicle), and emission directions of the laser light, as illustrated in FIG. 2A. Since the positive z-direction in FIG. 2 may be paraphrased as a vertically upward direction, the vertical scanning process is a process of scanning angles between the vertically upward direction and emission directions of the laser light. The horizontal scanning process is a process of scanning angles between the y-direction and emission directions of the laser light, as illustrated in FIG. 2B. Since the positive y-direction in FIG. 2 is the left direction of the vehicle VC, the horizontal scanning process is a process of scanning angles between the left or right direction of the vehicle VC and emission directions of the laser light. In the following, the vertical scanning process is referred to as a process in which the scanning direction of the laser light is vertical, and the horizontal scanning process is referred to as a process in which the scanning direction of the laser light is horizontal.

FIG. 2A illustrates optical axes OP(1*j*) to OP(8*j*) of the laser light along which the vertical scanning process is performed by the optical sensor 10. In this specification, each optical axis OP is defined as a line passing through the center of an area where the laser light arrives at the same time. In other words, each optical axis OP is an average direction in which the laser light travels. That is, the laser light spreads as it travels away from the optical sensor 10, and angles between the average directions of the laser light and the vertically upward direction are scanned in the vertical scanning process. FIG. 2A illustrates an example in which there are eight angles between the vertically upward direction and the optical axes OP along which the laser light is emitted in the vertical scanning process.

FIG. 2B illustrates an example of optical axes OP(i1), OP(i2), . . . along which the laser light is emitted in the horizontal scanning process by the optical sensor 10. The variable i used to denote "optical axis OP (ij)" is a variable that distinguishes optical axes OP whose angles with respect to the vertically upward direction are different from each other, and the variable j is a variable that distinguishes optical axes OP whose angles with respect to the right or left direction are different from each other.

The optical sensor 10 periodically emits laser light into a predefined region in the horizontal and vertical directions via the horizontal and vertical scanning processes.

Each cycle corresponds to one frame. The optical sensor 10 generates and outputs range point data for each frame. In the following, the range point data for one frame is referred to as range point cloud data.

Returning to FIG. 1, the LIDAR ECU 20 performs an emission pattern control process that is a process of controlling an emission pattern of the laser light emitted by the optical sensor 10. The LIDAR ECU 20 acquires the range point data generated by the optical sensor 10 and performs an object recognition process that is a process of recognizing objects around the vehicle. The LIDAR ECU 20 includes a CPU 22, a ROM 24, and peripheral circuits 26, which are communicable with each other via a communication line 28. The peripheral circuits 26 include a circuit that generates clock signals to define internal operations, a power supply circuit, a reset circuit, and other circuits. The LIDAR ECU 20 performs the emission pattern control process and the object recognition process by the CPU 22 executing programs stored in the ROM 24.

The LIDAR ECU 20 acquires, via the local network 30 in the vehicle VC, a vehicle speed SPD detected by a vehicle speed sensor 40, a state signal Swin of a turn indicator 42, and a steering angle θs detected by a steering angle sensor 44. The LIDAR ECU 20 acquires, via the local network 30 in the vehicle VC, map data 46 and location data Dgps from the global positioning system (GPS 48). The LIDAR ECU 20 is communicable with an Advanced Driver Assistance System (ADAS) ECU 50. The optical sensor 10 and the LIDAR ECU 20 correspond to a LIDAR device.

The ADAS ECU 50 performs a process of assisting a user in driving the vehicle VC. In the present embodiment, driving assistance on automobile roads, such as so-called adaptive cruise control, which controls driving of the vehicle VC to achieve a target vehicle speed while prioritizing keeping a distance from a preceding vehicle at or above a predefined value, is exemplified as a driving assistance. In particular, driving assistance according to the present embodiment includes a process of, in response to detecting an obstacle on an automobile road, notifying the user thereof. The ADAS ECU 50 includes a CPU 52, a ROM 54, and periphery circuits 56, which are communicable with each other via a communication line 58.

FIG. 3 illustrates a procedure for detecting obstacles, especially low-profile objects with a small vertical distance, that is, a small height from a road surface. The low-profile objects refer here to objects that do not move by themselves, such as dropped objects. The process flow illustrated FIG. 3 is implemented by the CPU 22 repeatedly performing the program stored in the ROM 24 at predefined intervals. In the following, each step is represented by a number with the prefix "S".

In the sequence of process steps illustrated in FIG. 3, the CPU 22 first determines whether an obstacle or a preceding vehicle has been recognized in the direction of travel of the vehicle VC (at S10). If the CPU 22 determines that no obstacle or preceding vehicle has been recognized ("NO" branch of step S10), the CPU 22 performs a process of early detecting a low-profile object in the direction of travel of the vehicle VC. That is, the CPU 22 first performs a vehicle speed acquisition process (at S12). That is, the CPU 22 acquires the vehicle speed SPD (at S12). The CPU 22 sets the search distance L that is a distance relative to the vehicle VC for detecting a low-profile object (at S14). The CPU 22 sets the search distance L to a larger value when the vehicle speed SPD is high than when the vehicle speed SPD is low. This is a setting to inhibit a time from detection of a low-profile object to arrival of the vehicle VC at a location where the low-profile object is located from becoming shorter when the vehicle speed SPD is high than when the vehicle speed SPD is low. In the present embodiment, the CPU 22 increases the search distance L continuously in proportion to the vehicle speed SPD.

Next, the CPU 22 acquires the location data Dgps and information about the location indicated by the location data Dgps among the information the map data 46 maintains, as well as the steering angle θs and the state signal Swin of the turn indicator (at S16). The CPU 52 determines a lane in which the vehicle VC is traveling, based on the information about the location indicated by the position data Dgps among the information the map data 46 maintains and a result of lane recognition based on the range point data by the optical sensor 10 (at S18). For example, in a case where it is recognized based on the map data 46 that the vehicle VC is traveling on a road with two lanes in each direction, the CPU 22 determines whether the vehicle VC is traveling in the right lane or the left lane of the two lanes based on the range point data.

Next, the CPU 22 sets a search plane in the forward direction of travel of the vehicle VC, at the search distance L from the vehicle VC (S20), where the search plane is a region to which the laser light is emitted for detecting low-profile objects. The CPU 22 sets the search plane to include the region to be reached by the vehicle VC traveling. In other words, the search plane is set to intersect an expected travel trajectory of the vehicle VC.

Specifically, the CPU 22 sets the search plane with reference to values of variables that indicate a driving state of the vehicle VC, such as the steering angle θs and the state signal Swin of the turn indicator.

Figure 4B:
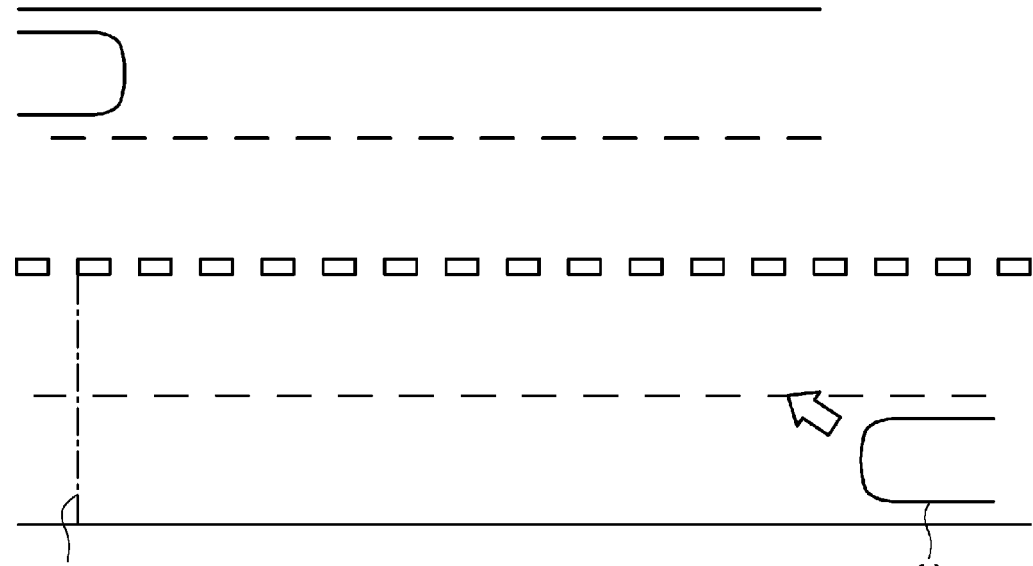
FIG. 4B is illustration of another example of a method of setting a search plane according the first embodiment.
Figure 4A:
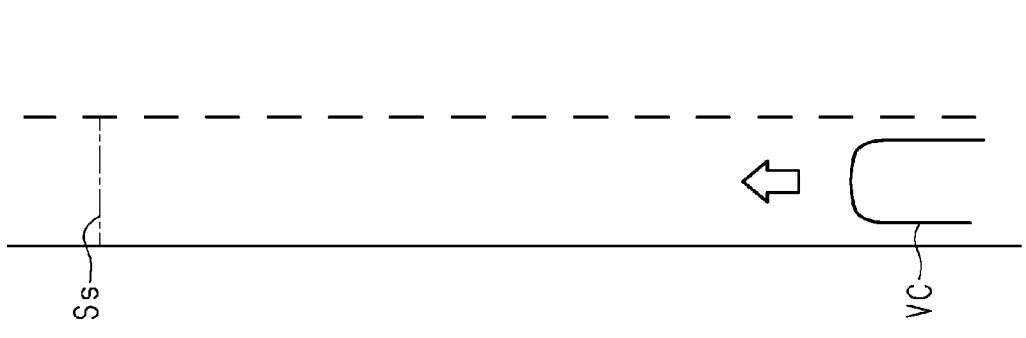
FIG. 4A is illustration of an example of a method of setting a search plane according the first embodiment.

For example, in a case where the vehicle VC is traveling straight forward, the CPU 22 sets the horizontal ends of the search plane Ss to the edges of the lane in which the vehicle VC is traveling, in the horizontal direction, as illustrated in FIG. 4A. In another case where the vehicle VC is expected to make a lane change to the right lane, such as when the steering angle θs is an angle indicating right turn or when the state signal Swin of the turn indicator is in the right-turn state, the CPU 22 sets one of the horizontal ends of the search plane Ss to the left edge of the lane in which the vehicle VC is traveling and the other to the right edge of the right adjacent lane, as illustrated in FIG. 4B.

The CPU 22 sets the search plane Ss to a plane perpendicular to the road surface. That is, the CPU 22 acquires slope information of the road surface on which the vehicle VC is traveling based on information about the location indicated by the location data Dgps among the information the map data 46 maintains, and sets the search plane Ss to a plane perpendicular to the road surface according to the slope information.

Returning to FIG. 3, the CPU 22 sets an emission pattern of laser light for a first distance measurement range (at S22). The emission pattern of laser light for the first distance measurement range is a pattern that satisfies a requirement of the vertical resolution being at or above a certain level in order to detect low-profile objects. Next, the CPU 22 sets an emission pattern of laser light for a second distance measurement range (at S24). The emission pattern of laser light for the second distance measurement range is a pattern with lower vertical resolution than the emission pattern of laser light for the first distance measurement range. The emission pattern of laser light for the second distance measurement range includes a pattern that is set at a detection limit farther away than the emission pattern of laser light for the first distance measurement range. The process steps S22 and S24 correspond to scanning and resolution adjustment processes.

This will now be described with reference to FIGS. 5 to 7.

Figure 5:
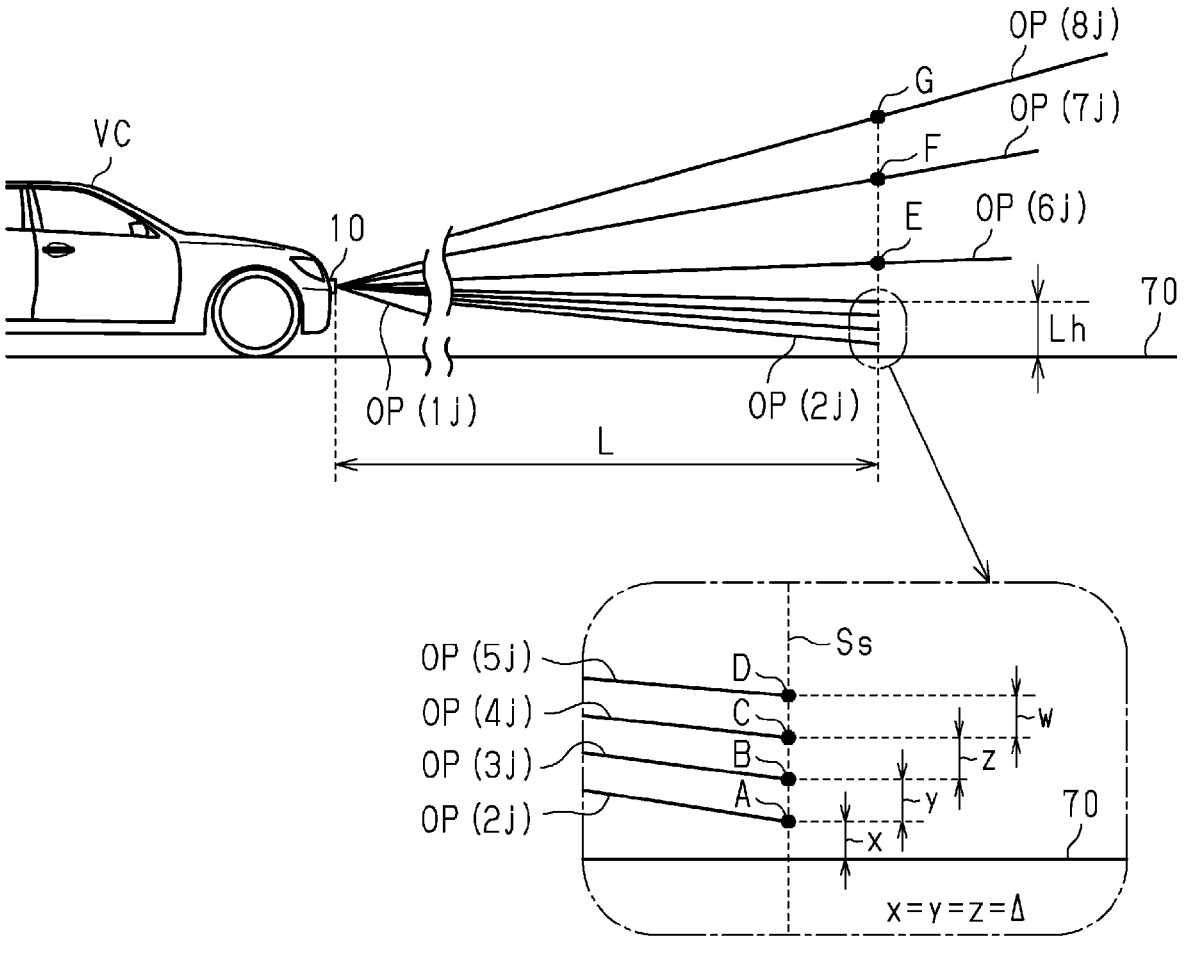
FIG. 5 is illustration of an example of an emission pattern according the first embodiment.

In FIG. 5, the optical axes OP(2*j*), OP(3*j*), OP(4*j*), and OP(5*j*) are optical axes according to the emission pattern of laser light for the first distance measurement range, and the optical axes OP(1*j*), OP(6*j*), OP(7*j*), and OP(8*j*) are optical axes according to the emission pattern of laser light for the second distance measurement range. The optical axes OP(2*j*), OP(3*j*), OP(4*j*), and OP(5*j*) correspond to directions A, B, C, and D, respectively. The optical axes OP (6*j*), OP (7*j*), and OP (8*j*) correspond to first, second, and third directions, respectively.

As illustrated in FIG. 5, the emission pattern of laser light for the first distance measurement range has a higher density of laser light than the emission pattern of laser light for the second distance measurement range. Here, the density of the laser light is defined as the number of optical axes OP per unit angle. The unit angle here is an angle in the vertical direction. In the present embodiment, the number of optical axes OP per unit angle in the horizontal direction in the emission pattern of laser light for the first distance measurement range is greater than or equal to the number in the emission pattern of laser light for the second distance measurement range. Therefore, even in a case where the density of laser light is defined as the number of optical axes OP per unit solid angle, the emission pattern of laser light for the first distance measurement range has a higher density of laser light than that for the second distance measurement range in the present embodiment.

This is a setting to make effective use of limited resources in low-resolution LIDAR. That is, in the present embodiment, a relatively low-resolution LIDAR is contemplated where the number of optical axes OPs whose angles with respect to the vertically upward direction differ from each other is in the single digits. Thus, setting the same angle difference in the vertical direction between the optical axes OP adjacent to each other that differ in the angle with respect to the vertically upward direction may be insufficient for detecting low-profile objects rapidly.

FIG. 5 illustrates an example in which laser light traveling along each of the four optical axes OP(2*j*), OP(3*j*), OP(4*j*), and OP(5*j*) reaches a region of the search plane Ss, which region is in the vertically upward direction of the road surface 70 and at up to a distance from the road surface 70 that is less than or equal to a specified value Lh. Here, the specified value Lh is less than or equal to a vertical distance between the position where laser light is emitted from the optical sensor 10 and the road surface 70 in the present embodiment. This allows a region where low-profile objects may exist to be exposed intensively to the laser light.

Furthermore, in the present embodiment, in the emission pattern of laser light for the first distance measurement range, distances between arrival positions A, B, C, and D on the search plane Ss, of the laser light traveling along the optical axes OP that are adjacent to each other, are less than or equal to a specified amount Δ. Here, the specified amount Δ may be less than or equal to 20 cm, more preferably less than or equal to 10 cm. Specifically, in the present embodiment, the vertical distance x between the arrival position A and the road surface 70, the vertical distance y between the arrival position A and the arrival position B, the vertical distance z between the arrival position B and the arrival position C, and the vertical distance w between the arrival position C and the arrival position D are set to the specified amount Δ.

This is implemented by adjusting the angle difference between the optical axes OP vertically adjacent to each other.

That is, for example, if the angle difference between the adjacent optical axes OP(2j) and OP(3j) and the angle difference between the adjacent optical axes OP(3j) and OP(4j) are the same, the above distances y and z are different from each other. Specifically, the distance y is greater than the distance z. Therefore, with the same angle difference between the optical axes OP adjacent to each other, it is necessary to increase the number of emissions of laser light with increasing angle of the emission direction with respect to the vertically upward direction in order to comply with the resolution constraint that the distances between arrival positions adjacent to each other on the search plane Ss be less than or equal to the specified amount Δ.

Figure 6:
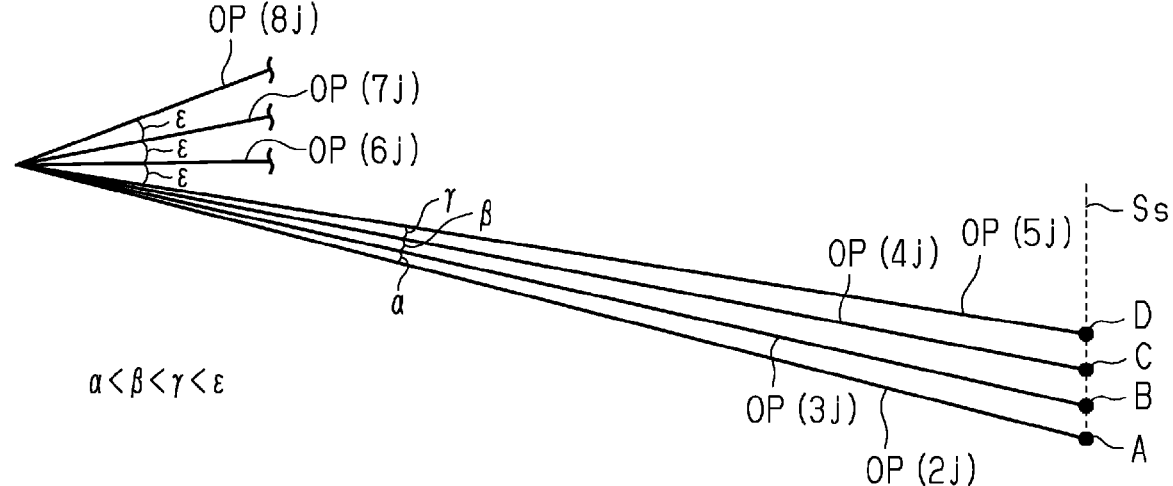
FIG. 6 is illustration of an example of emission angles implementing the emission pattern according the first embodiment.

In the present embodiment, as illustrated in FIG. 6, the larger the difference in angle with respect to the vertically upward direction, the smaller the difference in angle between adjacent optical axes OP in the first distance measurement range. That is, a relationship of "α<β<γ" is set for the angle difference α in the vertical direction between the optical axis OP (2j) and optical axis OP (3j), the angle difference β in the vertical direction between the optical axis OP (3j) and optical axis OP (4j), and the angle difference α in the vertical direction between the optical axis OP (4j) and optical axis OP (5j). This allows the resolution constraint to be met without increasing the number of times the laser light is emitted in different vertical directions from each other in the first distance measurement range.

The angle differences in the vertical direction between the optical axes OP adjacent to each other according to the emission pattern of laser light for the second distance measurement range are set to the same angle difference ε. This angle difference ε is greater than any of the angle differences in the vertical direction between the optical axes OP adjacent to each other according to the emission pattern of laser light for the first distance measurement range. This makes the emission pattern of laser light for the first distance measurement range denser than the emission pattern of the second distance measurement range.

By the way, the setting illustrated in FIG. 6, where the angle difference between optical axes OP adjacent to each other in the first distance measurement range decreases as the angle difference from the vertically upward direction increases, is valid only when the road surface 70 is flat, but is not generally valid for all road surfaces 70.

Figure 7:
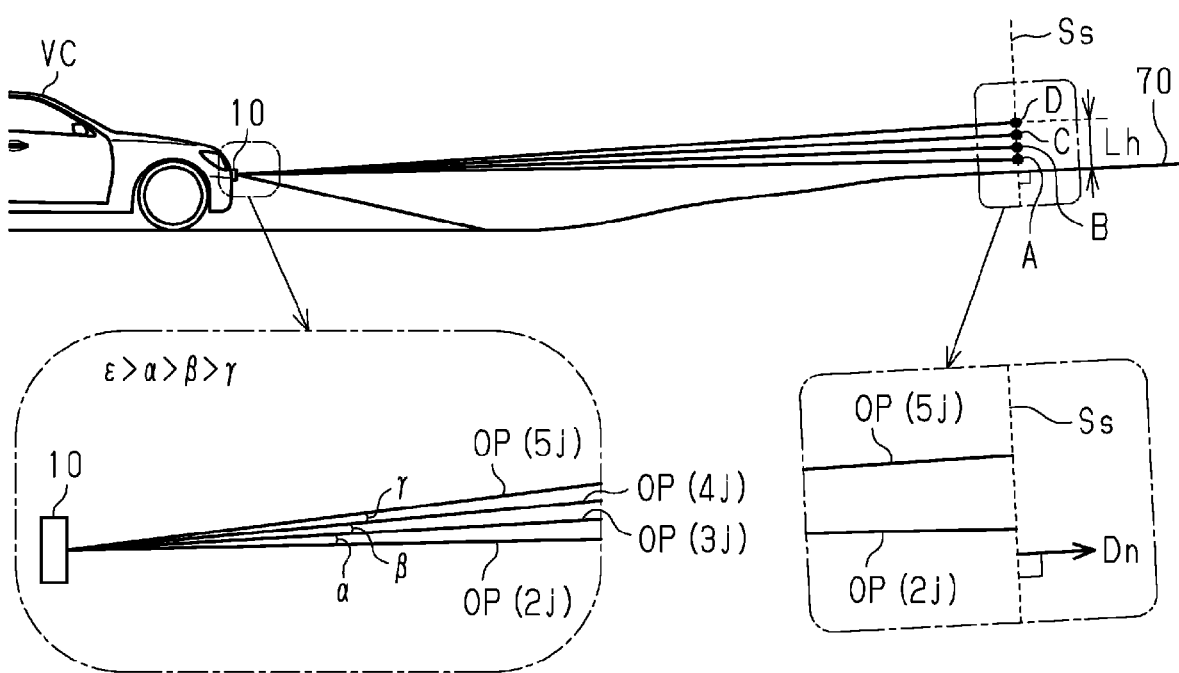
FIG. 7 is illustration of an example of an emission pattern according the first embodiment.

FIG. 7 illustrates a case where the road surface 70 is uphill in the forward direction of travel of the vehicle VC. In the example illustrated in FIG. 7, the angle difference α in the vertical direction between the optical axis OP (2j) having the largest angle difference from the vertically upward direction and the optical axis OP (3j) adjacent to the optical axis OP (2j) is greater than the angle difference β in the vertical direction between the optical axes OP (3j) and OP (4j). Furthermore, the angle difference β in the vertical direction between the optical axes OP (3j) and OP (4j) is greater than the angle difference γ in the vertical direction between the optical axes OP (4j) and OP (5j). This is because the angle between an optical axis and a direction Dn in the vertical direction, where the direction Dn is normal to the search plane Ss perpendicular to the road surface 70 and positive in the direction of travel of the vehicle VC, increases in the order of the optical axes OP(2j), OP(3j), OP(4j) and OP(5j). That is, the smaller the angle with respect to the above direction Dn in the vertical direction, the smaller the distance at which the optical axis OP reaches the search plane Ss. The angle of rotation required to draw an arc of fixed length with a small radius is greater than the angle of rotation required to draw the arc of fixed length with a large radius. Therefore, the angle difference α in the vertical direction between the optical axes OP (2j) and OP (3j) is the largest in the first distance measurement range.

Note that, in FIG. 5, the optical axis OP(2j) in the first distance measurement range, has, in the vertical direction, a maximum angle with respect to the direction Dn that is normal to the search plane Ss and positive in the direction of travel of the vehicle VC. In FIG. 7, the angle difference α in the vertical direction between the optical axes OP (2j) and OP (3j) is less than the angle difference ε in the vertical direction between the optical axes OP adjacent to each other according to the emission pattern of laser light for the second distance measurement range.

Furthermore, the CPU 22 increases the angle difference in the vertical direction between adjacent optical axes OP in the emission pattern of laser light for the first distance measurement range when the vehicle speed SPD is low as compared to when the speed SPD is high. This setting is made taking into account that the search distance L is set to a smaller value when the vehicle speed SPD is low than when the vehicle speed SPD is high.

Figure 8:
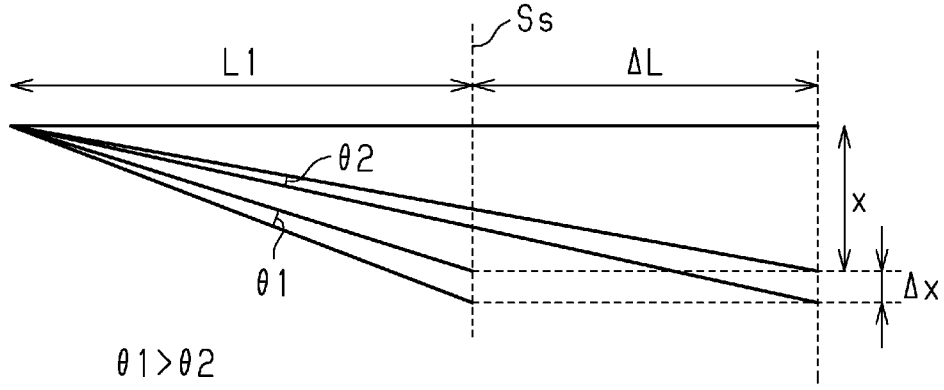
FIG. 8 is illustration of an example of emission angles implementing the emission pattern according the first embodiment.

FIG. 8 illustrates an example where the angle difference θ2 in the vertical direction between adjacent optical axes OP when the search distance L is L1+ΔL is less than the angle difference θ1 in the vertical direction between adjacent optical axes OP when the search distance L is L1. This relationship is generally true when L1 is sufficiently large as compared to the distance x in FIG. 8. That is, the emission direction of the laser light is changed such that the angle with respect to the normal direction of the search plane Ss is smaller when the search distance L is large than when the search distance L is small, which allows the effect of the angle difference becoming larger due to the longer search distance L to be greater than the effect of the angle difference becoming larger. This is because, referring to FIG. 8, by defining that $\tan \theta = x/L1$ and $\tan(\theta+\theta 1) = (x+\Delta x)/L1$ with x and Δx being fixed values, the derivative of θ1 by L1 will be negative when L1 is sufficiently greater than x. This conclusion is not only valid for flat roads. Supposing that the length of the perpendicular line from the optical sensor 10 to the search plane Ss is denoted by L1, the same conclusion is reached as long as L1 increases with increasing search distance L.

Preferably, the search distance L may be set within a range of 50 to 200 m according to the vehicle speed SPD. In the present embodiment, in the emission pattern of laser light for the second distance measurement range, the angle difference may not be variably set according to the vehicle speed SPD.

Figures 9A, 9B:
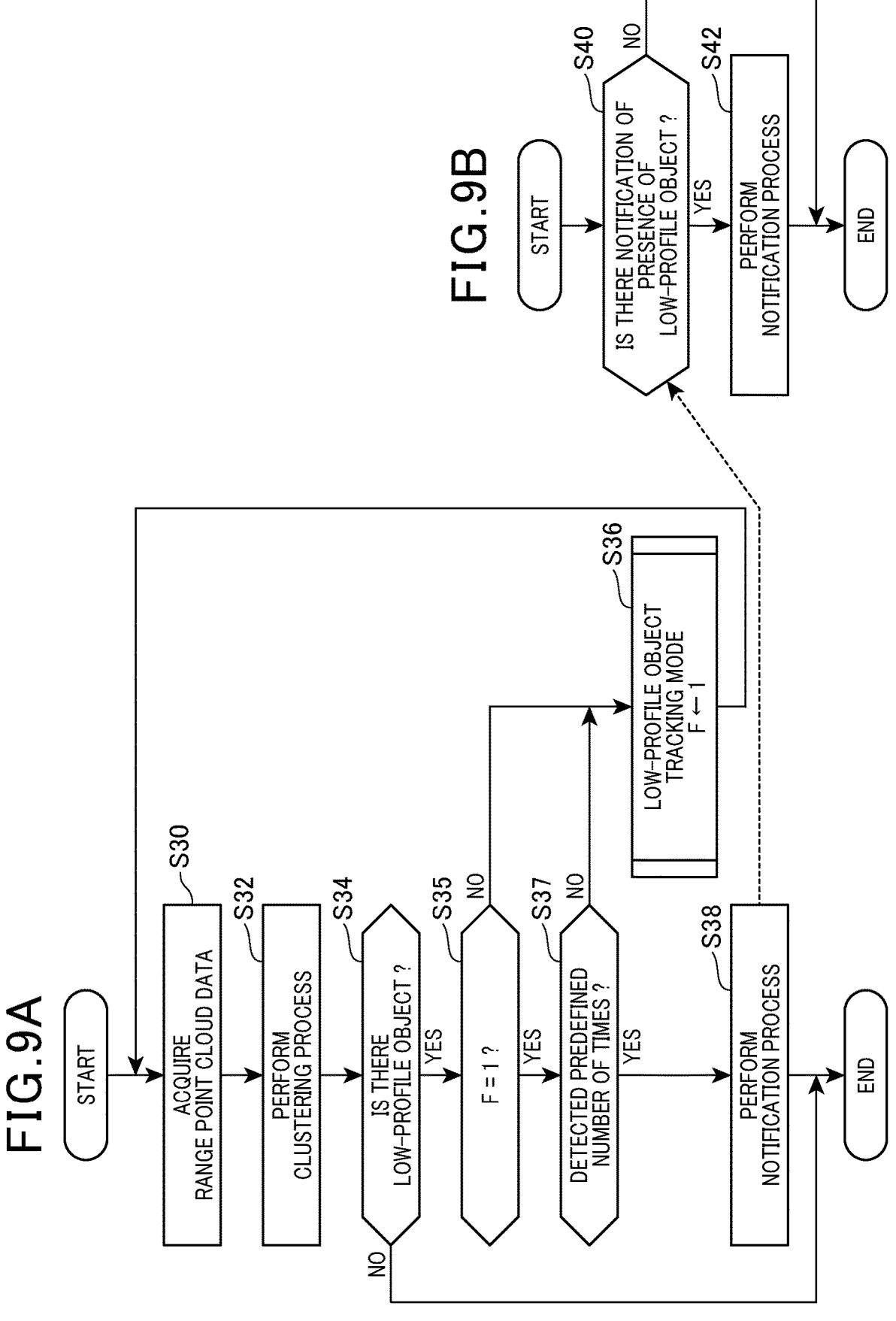
FIGS. 9A and 9B are a flowchart of a process performed by a LIDAR ECU and an ADAS ECU according the first embodiment.

FIGS. 9A and 9B illustrate a process flow using reflected light of the laser light emitted according to the emission patterns for the first and second distance measurement ranges. The process illustrated in FIG. 9A is performed by the CPU 22 repeatedly executing the program stored in the ROM 24, for example, at predefined time intervals. The process illustrated in FIG. 9B is performed by the CPU 52 repeatedly executing a program stored in the ROM 54, for example, at predefined time intervals.

As illustrated in FIG. 9A, the CPU 22 first acquires range point cloud data generated by the optical sensor 10 (at S30). The CPU 22 performs a clustering process (at S32) to classify range points indicated by the range point cloud data into groups, where a distance between any pair of ranging points of an object reflecting the laser light belonging to the same group is less than or equal to a predefined value. In the present embodiment, range point data indicating a range point, a distance between which range point and a range point indicated by any other range point data is greater than the predefined value is discarded as not belonging to any group.

Next, the CPU 22 determines whether there is a low-profile object based on a result of the clustering process (at S34). Here, in response to detecting, among the range point data grouped in the clustering process, a group that includes two or more pieces of range point data based on the reflected laser light according to the emission pattern of laser light for the first distance measurement range, the CPU 22 determines that there is a low-profile object.

If the CPU 22 determines that there is a low-profile object ("YES" branch of S34), the CPU 22 determines whether a value of flag F is one (at S35). The value of flag F is one when the CPU 22 is in a tracking mode described later, and zero otherwise. If the CPU 22 determines that the value of flag F is zero ("NO" branch of S35), the CPU 22 transitions to the low-profile object tracking mode in which the emission density of laser light near a low-profile object is increased to monitor the low-profile object, and sets the value of flag F to one (at S36). This will result in the answer "YES" at the process step S10 in FIG. 3.

If the CPU 22 determines that the value of flag F is one ("YES" branch of S35), the CPU 22 determines whether a low-profile object has been detected a predefined number of times in the tracking mode (at S37). If the CPU 22 determines that the low-profile object has not yet been detected the predefined number of times ("NO" branch of S37), the CPU 22 proceeds to S36.

Figure 10:
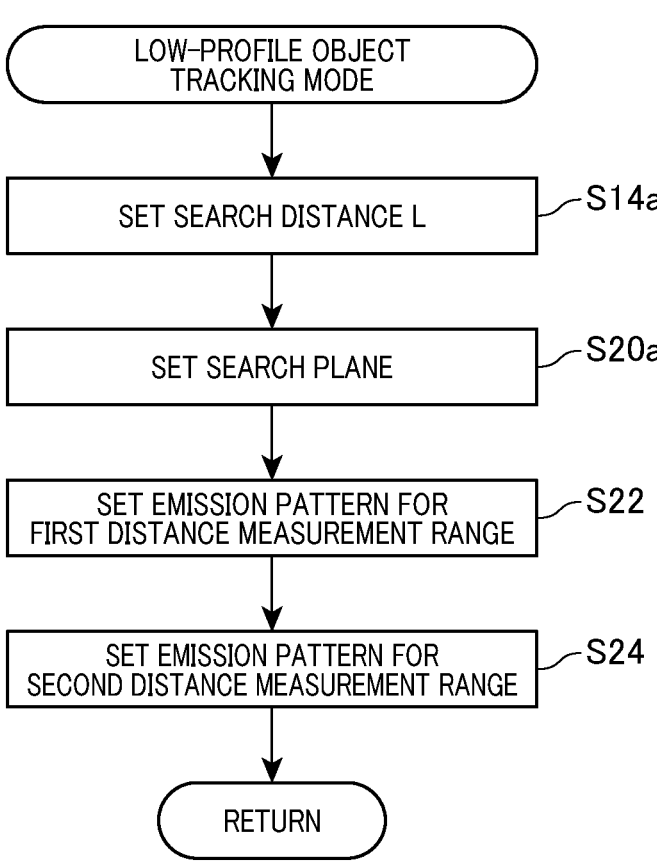
FIG. 10 is a flowchart of a portion of the process performed by the LIDAR ECU according the first embodiment.

FIG. 10 illustrates the process step S36 in detail. In FIG. 10, the process steps corresponding to those illustrated in FIG. 3 are assigned the same step numbers for convenience.

In the sequence of process steps illustrated in FIG. 10, the CPU 22 sets the search distance L by substituting a distance between the vehicle VC and the low-profile object detected at S32 into the search distance L (at S14a). Since the distance between the vehicle VC and the low-profile object decreases as the vehicle VC travels, the CPU 22 changes the search distance L to a smaller value as the distance the vehicle VC travels forward increases.

Next, the CPU 22 sets the above search plane Ss (at S20a). The CPU 22 performs the process steps S22 and S24. Upon completion of the process step S24, the CPU 22 terminates the process step S36 in FIG. 9A.

Returning to FIGS. 9A and 9B, in response to determining that a low-profile object has been detected the predefined number of times ("YES" branch of S37), the CPU 22 notifies the ADAS ECU 50 of the presence of a low-profile object via the local network 30 (at S38). Upon completion of the process step S38 or the answer being "NO" at S34, the CPU 22 terminates the process flow illustrated in FIG. 9A. Incidentally, in a case where a low-profile object can no longer be detected in the tracking mode, the CPU 22 may terminate the tracking mode and delete detection history of the low-profile object.

As illustrated in FIG. 9B, the CPU 52 of the ADAS ECU 50 determines whether there is a notification of the presence of a low-profile object (at S40). If the CPU 52 determines that there is a notification of the presence of a low-profile object ("YES" branch of step S40), the CPU 52 performs a notification process (at S42) to notify the user of the presence of a low-profile object by operating the speaker 60 depicted in FIG. 1. Upon completion of the process step S42 or the answer being "NO" at S40, the CPU 52 terminates the process flow illustrated in FIG. 9B.

The actions and effects of the present embodiment will now be described.

In a case where the CPU 22 has not recognized any obstacle or preceding vehicle ahead of the vehicle VC, the CPU 22 increases the density of laser light emitted to a region at a predefined distance in the forward travel direction and within a distance to the road surface 70 less than or equal to a predefined value Lh, thereby rapidly detecting the low-profile object in the event of a potential collision between the future travel trajectory of the vehicle VC and a low-profile object. This enables rapid detection of a low-profile object with effective use of limited resources.

The present embodiment described above can further provide the following actions and effects.

(1) In a case where the CPU 22 has not recognized the presence of a low-profile object or the like, the CPU 22 sets the search distance L, which is a distance between the search plane Ss and the vehicle VC, to a larger value when the vehicle speed SPD is high than when the vehicle speed SPD is low. This ensures sufficient time between detection of the low-profile object by the vehicle speed SPD and arrival at the location of the low-profile object.

(2) In a case where the CPU 22 has not detected the presence of a low-profile object or the like, the CPU 22 decreases the angle difference between optical axes OP adjacent to each other in the first distance measurement range when the vehicle speed SPD is high as compared to when the vehicle speed SPD is low. This can prevent the emission density of laser light emitted to a region within a distance of the predefined value Lh from the road surface 70 from varying with the vehicle speed SPD.

(3) In the tracking mode after detection of the presence of a low-profile object or the like, the CPU 22 changes the search distance L to a smaller value as the distance the vehicle VC travels forward increases. This allows the search distance L to be set to the distance between the vehicle VC and the location where the presence of low-profile objects is detected, which in turn allows the emission density of laser light in the region where the low-profile object is detected to be controlled to a target emission density laser light.

(4) The CPU 22 decreases the angle difference in the vertical direction between optical axes OP adjacent to each other in the first distance measurement range as the angle with respect to the normal direction to the search plane Ss increases. This allows the distance between arrival positions of optical axes OP adjacent to each other on the search plane Ss to be less than or equal to the specified amount $\Delta$ without increasing the number of optical axes OP to be allocated to the first distance measurement range.

(5) The CPU 22 unifies the distance between arrival positions on the search plane Ss of each pair of adjacent optical axes OP in the first distance measurement range to the specified amount Δ. This allows objects near the road surface 70 to be captured with higher accuracy.

Second Embodiment

A second embodiment is similar in basic configuration to the first embodiment. Thus, duplicate description regarding the common configuration will be omitted and differences from the first embodiment will be mainly described below.

Figure 11:
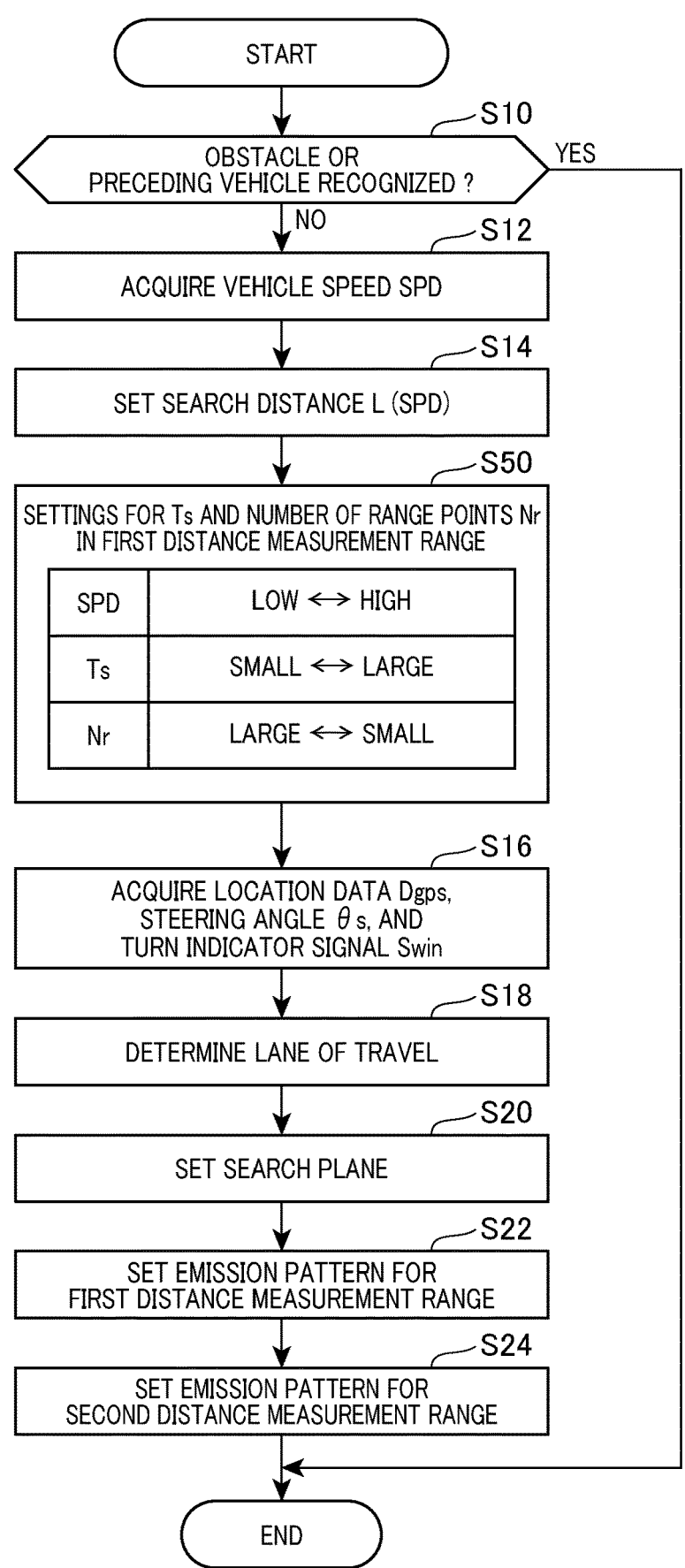
FIG. 11 is a flowchart of a process performed by a LIDAR ECU according a second embodiment.

FIG. 11 illustrates a process flow performed by the LIDAR ECU 20 according to the present embodiment. The process steps illustrated in FIG. 11 are performed by the CPU 22 repeatedly executing the program stored in the ROM 24, for example, at predefined time intervals. In FIG. 11, the process steps corresponding to those illustrated in FIG. 3 are assigned the same step numbers for convenience and duplicate description regarding these process steps will be omitted.

In the sequence of process steps illustrated in FIG. 11, upon completion of the process step S14, the CPU 22 sets a sampling period Ts during which the frequency of FMCW laser light is changed, and the number of range points Nr in the first distance measurement range (at S50). Here, the number of range points Nr means the number of types of laser light emission directions. That is, the number of range points Nr is defined as the number of optical axes OPs having at least one of the vertical and horizontal scanning directions different from each other.

Figures 12A, 12B:
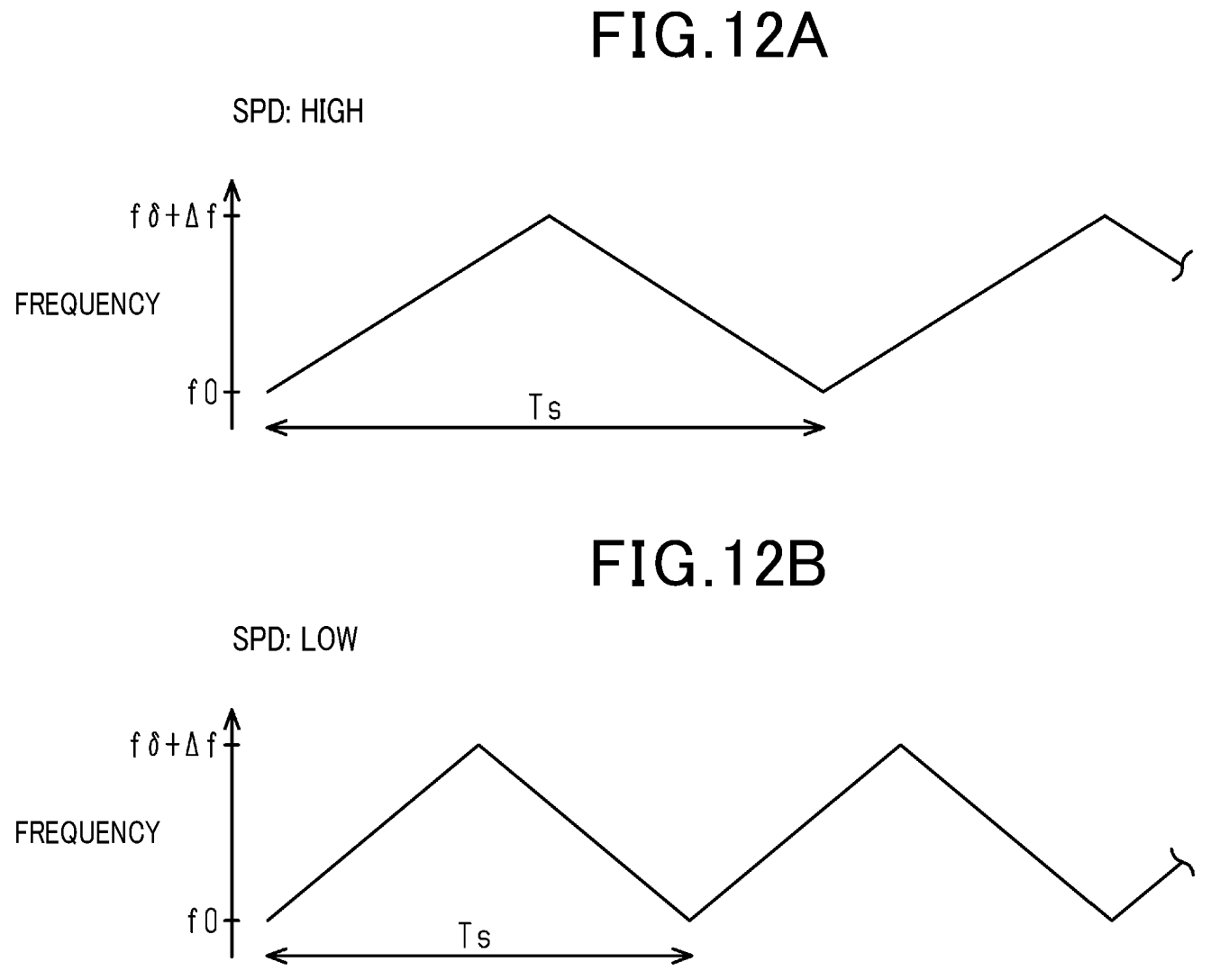

Specifically, when the vehicle speed SPD is low as illustrated in FIG. 12B, the CPU 22 decreases the sampling period Ts as compared to when the vehicle speed SPD is high as illustrated in FIG. 12A. That is, when the search distance L is small, emission energy of laser light per range point in the first distance measurement range may be decreased as compared to when the search distance L is large, which allows the emission energy of laser light per range point to be decreased by decreasing the sampling period Ts.

Then, the CPU 22 increases the number of range points Nr when the vehicle speed SPD is low as compared to when the vehicle speed SPD is high, as illustrated in FIG. 11. This is a setting to take advantage of an increase in the number of sampling periods Ts within one frame due to the sampling period Ts being decreased. The process step S50 corresponds to a density increasing process.

Upon completion of the process step S50, the CPU 22 proceeds to the process step S16.

In this manner, according to the present embodiment, when the search distance L is small, the sampling period Ts is decreased as compared to when the search distance L is large, thereby inhibiting the amount of laser light emission energy per range point from being excessive relative to the required amount. When the sampling period Ts is decreased, the number of ranging points Nr may be increased, thereby increasing the emission density of laser light in the first distance measurement range.

Third Embodiment

A third embodiment is similar in basic configuration to the second embodiment. Thus, duplicate description regarding the common configuration will be omitted and differences from the second embodiment will be mainly described below.

Figure 13:
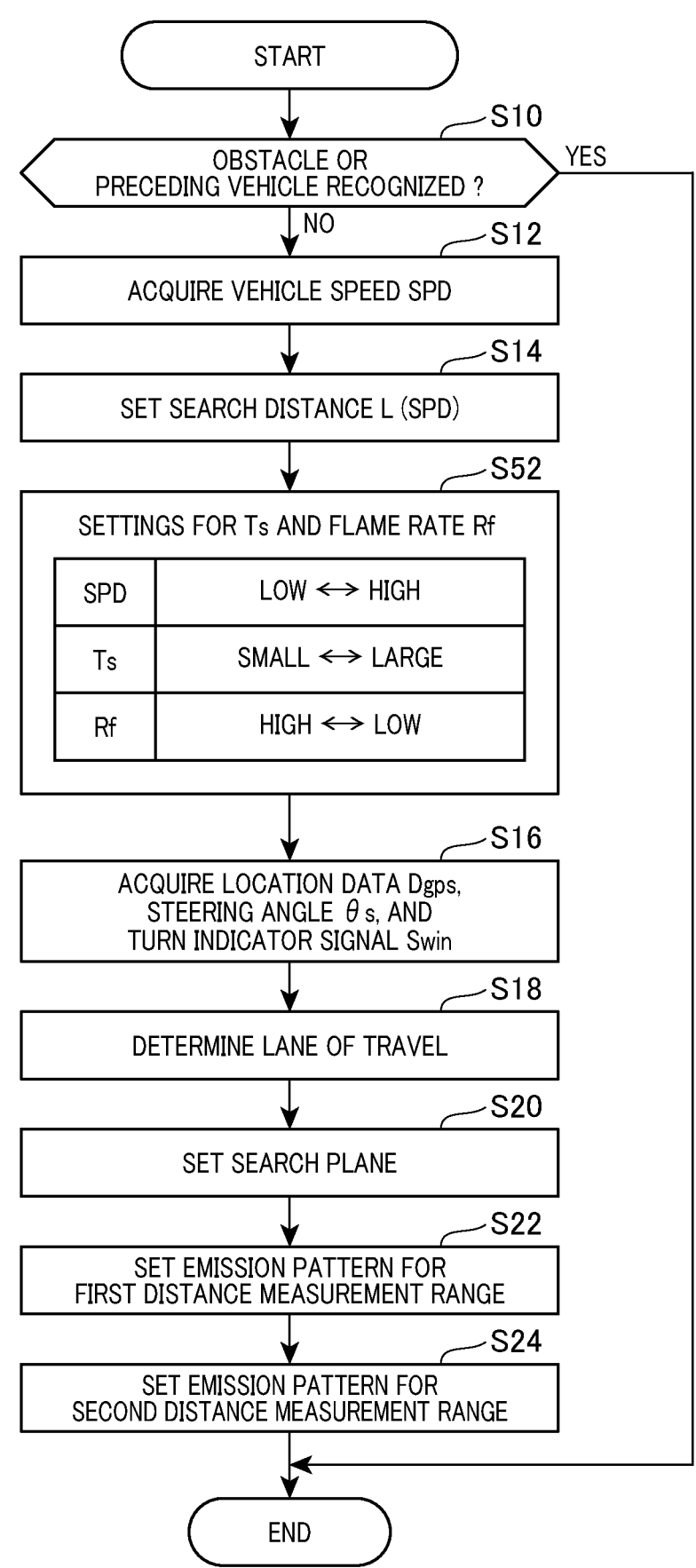
FIG. 13 is a flowchart of a process performed by a LIDAR ECU according a third embodiment.

FIG. 13 illustrates a process flow performed by the LIDAR ECU 20 according to the present embodiment. The process steps illustrated in FIG. 13 are performed by the CPU 22 repeatedly executing the program stored in the ROM 24, for example, at predefined time intervals. In FIG. 13, the process steps corresponding to those illustrated in FIG. 11 are assigned the same step numbers for convenience and duplicate description regarding these process steps will be omitted.

In the sequence of process steps illustrated in FIG. 13, upon completion of the process step S14, the CPU 22 sets the sampling period Ts and a frame rate Rf that is the number of frames per unit time (at S52). Here, the CPU 22 decreases the sampling period Ts when the vehicle speed SPD is low as compared to when the vehicle speed SPD is high. In addition, the CPU 22 increases the frame rate Rf when the vehicle speed SPD is low as compared to when the speed SPD is high. This is a setting in light of capability of decreasing the period per frame due to the sampling period Ts being decreased. The process step S52 corresponds to a decreasing process and a frame rate increasing process.

Upon completion of the process step S52, the CPU 22 proceeds to the process step S16.

In this manner, in the present embodiment, increasing the frame rate Rf while decreasing the sampling period Ts can improve the emission density of laser light in the first and second distance measurement ranges.

Fourth Embodiment

A fourth embodiment is similar in basic configuration to the first embodiment. Thus, duplicate description regarding the common configuration will be omitted and differences from the first embodiment will be mainly described below.

In the present embodiment, the LIDAR ECU 20 performs scanning with laser light focused on detecting road markings.

Figure 14:
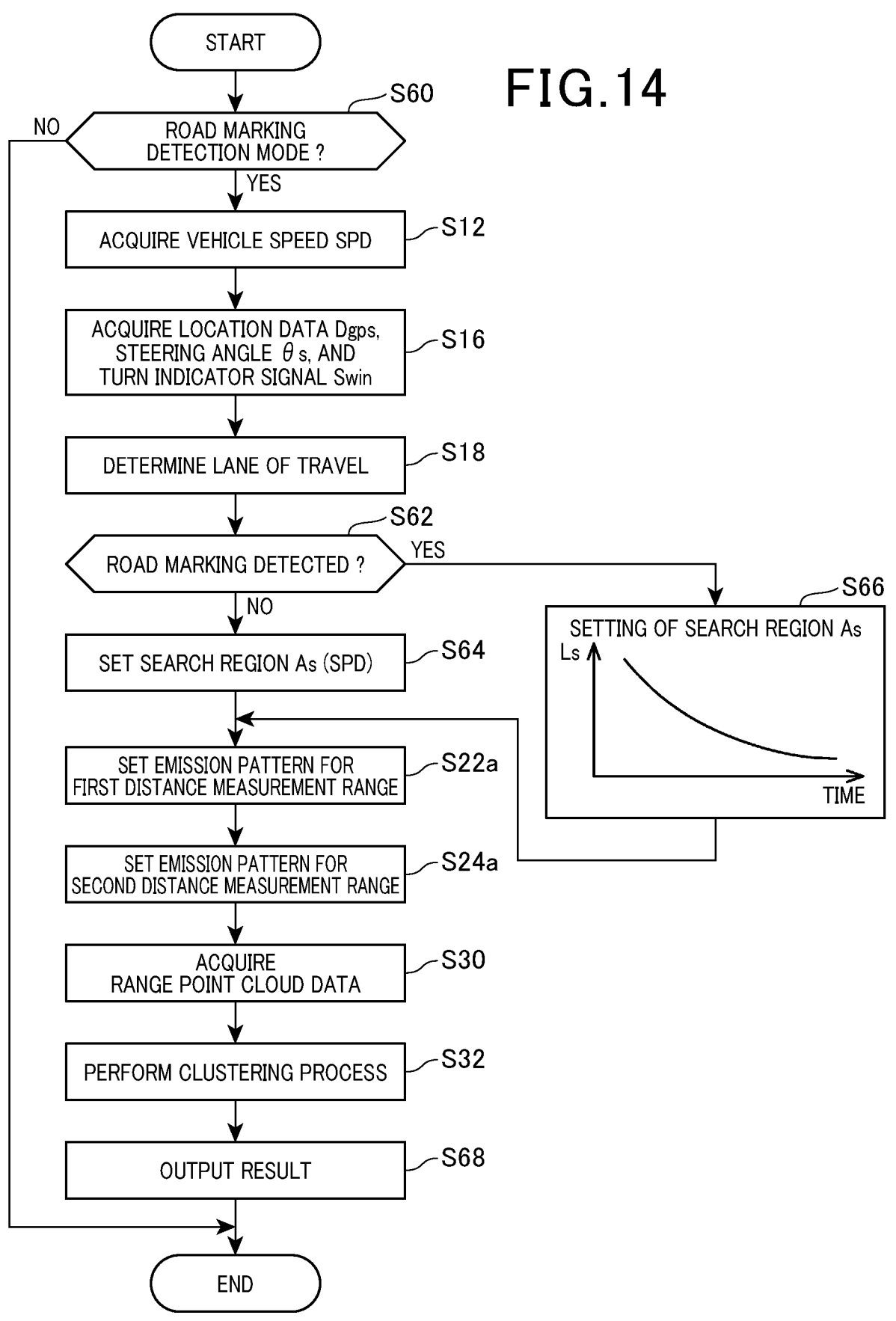
FIG. 14 is a flowchart of a process performed by a LIDAR ECU according a fourth embodiment.

FIG. 14 illustrates a process flow performed by the LIDAR ECU 20 according to the present embodiment. The process steps illustrated in FIG. 14 are performed by the CPU 22 repeatedly executing the program stored in the ROM 24, for example, at predefined time intervals. In FIG. 14, the process steps corresponding to those illustrated in FIG. 3 are assigned the same step numbers for convenience and duplicate description regarding these process steps will be omitted.

In the sequence of process steps illustrated in FIG. 14, the CPU 22 first determines whether it is in a road marking detection mode (at S60). For example, in a case where the ADAS ECU 50 has issued a command to implement the road marking detection mode, the CPU 22 may determine that it is in the road marking detection mode. In the present embodiment, the ADAS ECU 50 is configured to direct the LIDAR ECU 20 to transition to the road marking detection mode in order to detect a road marking under a certain condition where no road markings have been detected. When determining that the CPU 22 is in the road marking detection mode, the CPU 22 determines whether a road marking has been detected (at S62), after transitioning to the road marking detection mode after completion of the process steps S12, S16, and S18.

If determining that no road markings have been detected ("NO" branch of S62), the CPU 22 sets a search region As that is a region on the road surface for detecting road markings (at S64). The CPU 22 increases a distance Ls between the center of the search region As and the vehicle VC when the vehicle speed SPD is high as compared to when the vehicle speed SPD is low. This is a setting to ensure the time from detection of a road marking to arrival of the vehicle VC at a position where the road marking is located, regardless of the vehicle speed SPD.

If determining that a road marking has been detected ("YES" branch of S62), the CPU 22 transitions to a tracking mode to track the detected road marking in order to increase the detection accuracy of the road marking once detected (at S66). That is, the CPU 22 sets the search region As to a region where the road marking is detected. This corresponds to decreasing the distance Ls between the center of the search region As and the vehicle VC as the distance that the vehicle VC travels forward increases. This is implemented by the CPU 22 setting the distance Ls as a function of the vehicle speed SPD and time.

Upon completion of the process steps S64 and S66, the CPU 22 sets the emission pattern of laser light for the first distance measurement range (at S22a). The emission pattern of laser light for the first distance measurement range according to the present embodiment is a pattern that meets a requirement of the resolution in the search region As being at or above a certain level in order to detect road markings. Next, the CPU 22 sets the emission pattern of laser light for the second distance measurement range (at S24a). The emission pattern of laser light for the second distance measurement range has a lower emission density of laser light than the emission pattern of laser light for the first distance measurement range. The emission pattern of laser light for the second distance measurement range includes a pattern set at the detection limit farther than the search region. The process steps S22a and S24a correspond to a scanning process and a resolution adjustment process.

This will now be described using FIGS. 15 and 16.

Figure 15:
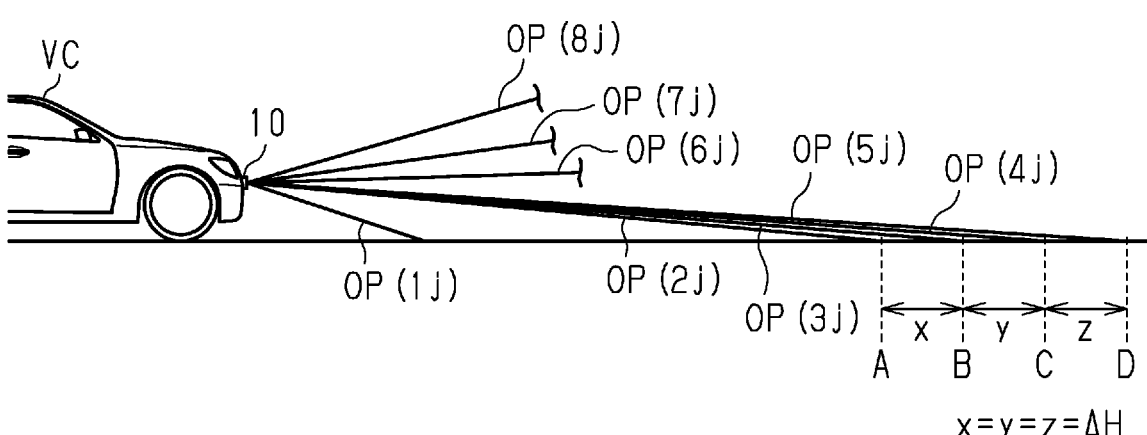
FIG. 15 is illustration of an example of an emission pattern according the fourth embodiment.

In FIG. 15, the optical axes OP(2j), OP(3j), OP(4j), and OP(5j) are optical axes according to the emission pattern of laser light for the first distance measurement range, and the optical axes OP(1j), OP(6j), OP(7j), and OP(8j) are optical axes according to the emission pattern of laser light for the second distance measurement range.

As illustrated in FIG. 15, the emission pattern of laser light for the first distance measurement range has a higher density of laser light in the vertical direction than the emission pattern of laser light for the second distance measurement range. The emission density of laser light in the horizontal direction according to the emission pattern of laser light for the first distance measurement range is higher than or equal to the emission density of laser light in the horizontal direction according to the emission pattern of laser light for the second distance measurement range. In particular, the emission pattern of laser light for the first distance measurement range in the present embodiment is a pattern with equal spacings between the arrival positions of the laser light on the road surface in the direction of travel of the vehicle VC. FIG. 15 illustrates arrival positions A, B, C, and D on the road surface, of laser light traveling along the respective optical axes OP(2j), OP(3j), OP(4j), and OP(5j), where a distance x between arrival positions A and B, a distance y between arrival positions B and C, and a distance z between arrival positions C and D are equal to each other and to a specified amount ΔH. Here, the specified amount ΔH may be less than or equal to 10 m, more preferably less than or equal to 5 m.

This is implemented by adjusting the angle difference between each pair of adjacent optical axes OP in the vertical direction.

Figure 16:
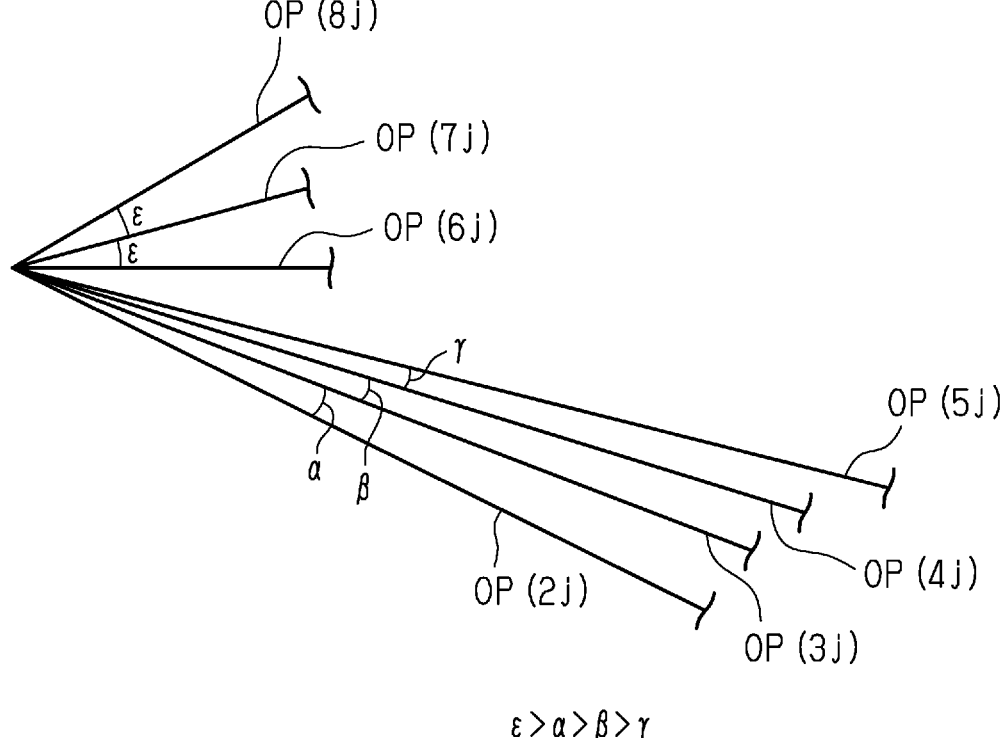
FIG. 16 is illustration of an example of emission angles implementing the emission pattern according the fourth embodiment.

That is, as illustrated in FIG. 16, the larger the difference in angle with respect to the vertically upward direction, the smaller the difference in angle between optical axes OP adjacent to each other in the first distance measurement range. That is, a relationship of "α>β>γ" is set for the angle difference α between the optical axis OP (2j) and optical axis OP (3j) in the vertical direction, the angle difference β between the optical axis OP (3j) and optical axis OP (4j) in the vertical direction, and the angle difference γ between the optical axis OP (4j) and optical axis OP (5j) in the vertical direction. These angle differences α, β, γ in the first distance measurement range are less than the angle difference between the optical axes OP adjacent to each other in the second distance measurement range. FIG. 16 illustrates that the angle difference between optical axes OP(6j) and OP(7j) and the angle difference between optical axes OP(7j) and OP(8j) are both equal to ε, and that the angle difference ε is greater than each of the angle differences α, β, and γ.

Returning to FIG. 14, upon completion of the process step S24a, the CPU 22 performs the process steps S30 and S32, and then outputs a result of the process step S32 to the ADAS ECU 50 (at S68).

Upon completion of the process step S68 or the answer being "NO" at S60, the CPU 22 terminates the process flow illustrated in FIG. 14.

In this manner according to the present embodiment, increasing the emission density of laser light in the search region As that is a predefined region on the road surface, according to the emission pattern of laser light for the first distance measurement range, can increase the resolution to detect road markings.

Fifth Embodiment

A fifth embodiment is similar in basic configuration to the first embodiment. Thus, duplicate description regarding the common configuration will be omitted and differences from the fifth embodiment will be mainly described below.

In the present embodiment, the LIDAR ECU 20 has an emission mode in which horizontal scanning with laser light is performed to rapidly detect a preceding vehicle or obstacle that prevents the vehicle VC from traveling, when the LIDAR ECU 20 has not yet detected such a preceding vehicle or obstacle.

Figure 17:
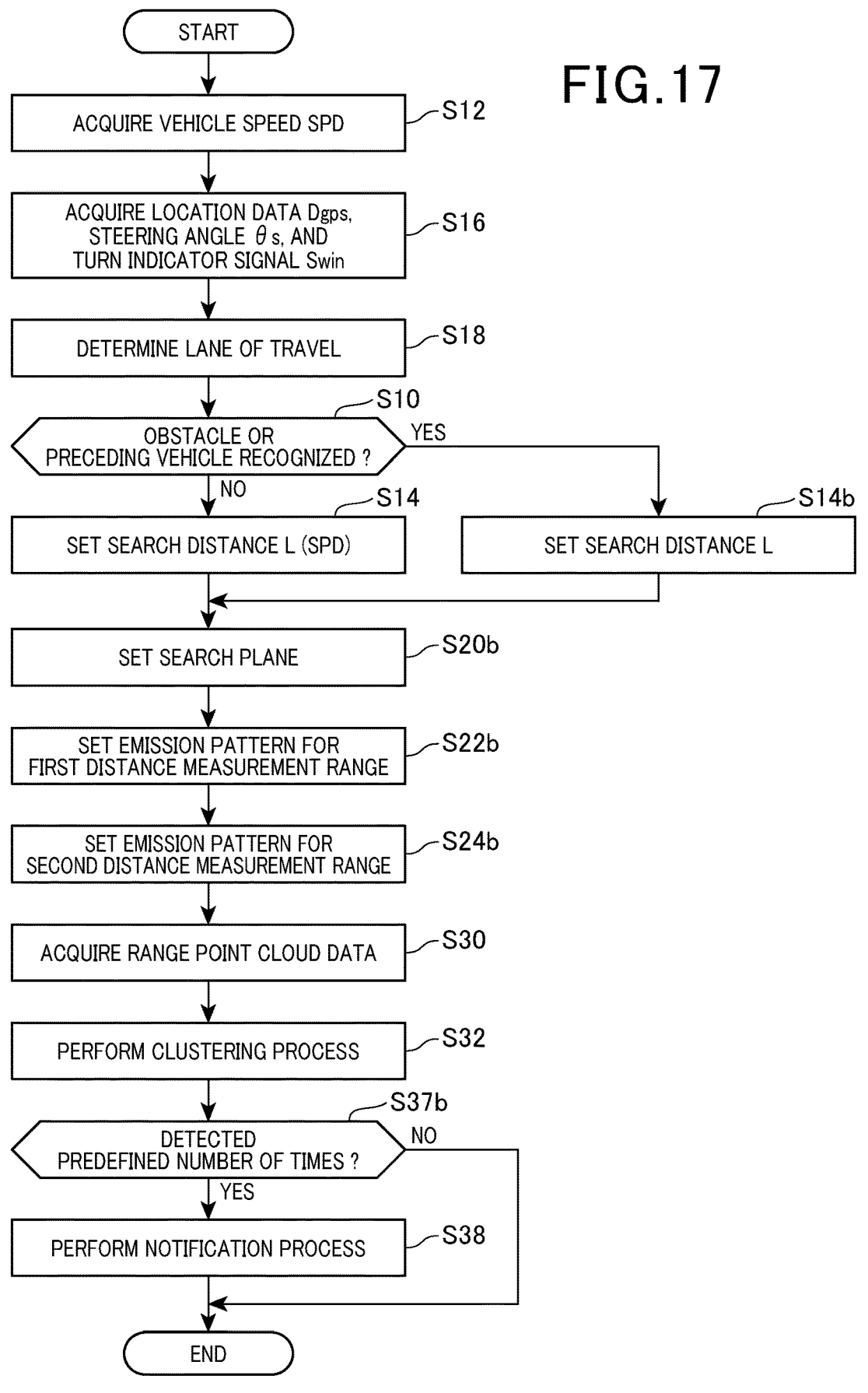
FIG. 17 is a flowchart of a process performed by a LIDAR ECU according a fifth embodiment.

FIG. 17 illustrates a process flow to rapidly detect a preceding vehicle or obstacle, performed by the LIDAR ECU 20 according to the present embodiment. The process steps illustrated in FIG. 17 are performed by the CPU 22 repeatedly executing the program stored in the ROM 24, for example, at predefined time intervals. In FIG. 17, the process steps corresponding to those illustrated in FIG. 3 are assigned the same step numbers for convenience and duplicate description regarding these process steps will be omitted.

In the sequence of process steps illustrated in FIG. 17, the CPU 22 performs the process steps S12, S16, and S18, and then performs the process step S10. If the CPU 22 determines that neither an obstacle nor a preceding vehicle has yet been detected ("NO" branch of S10), the CPU 22, as in FIG. 3, sets the search distance L according to the vehicle speed SPD (at S14). If the CPU 22 determines that an obstacle or a preceding vehicle has been detected ("YES" branch of S10), the CPU 22 sets the search distance L to a distance between the location where the obstacle or preceding vehicle is detected and the vehicle VC (at S14b). A mode in which the process step S14b is performed is a tracking mode for tracking an obstacle or a proceeding vehicle.

Upon completion of the process step S14 or S14b, the CPU 22 sets the search plane Ss (S20b). In the present embodiment, the horizontal width of the search plane Ss is the same as that set at S20. The vertical length of the search plane Ss is set to be greater than or equal to an assumed maximum height of the preceding vehicle.

Next, the CPU 22 sets the emission pattern of laser light for the first distance measurement range (at S22b). Subsequently, the CPU 22 sets the emission pattern of laser light for the second distance measurement range (at S24b). Here, the emission pattern of laser light for the first distance measurement range is a pattern in which laser light is emitted at a high density in the forward direction of travel of the vehicle VC, aiming at early detection of a preceding vehicle or obstacle. On the other hand, the emission pattern of laser light for the second distance measurement range is a pattern in which the laser light is emitted forward of the vehicle VC and laterally away from a future travel path of the vehicle VC. The emission pattern of laser light for the second distance measurement range has a lower emission density of laser light as compared to the emission pattern of laser light for the first distance measurement range. The process steps S22b and S24b correspond to a scanning process and a resolution adjustment process.

Figure 18:
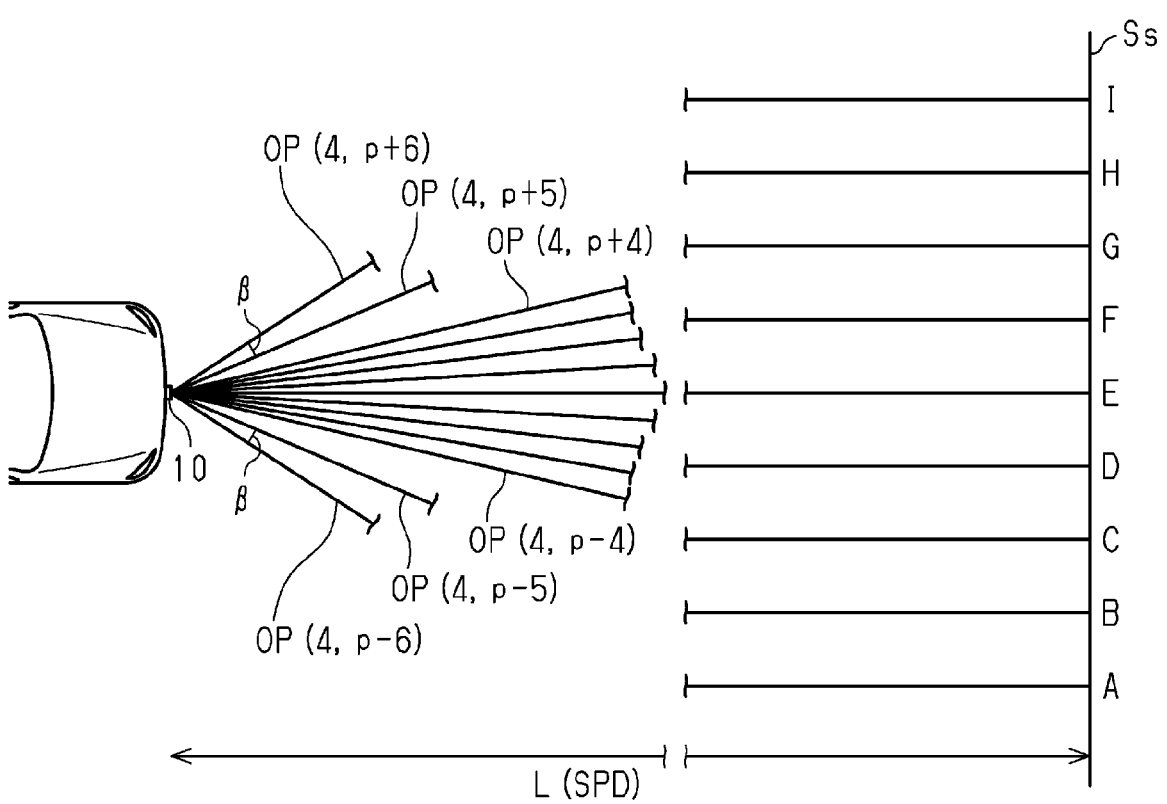
FIG. 18 is illustration of an example of an emission pattern according the fifth embodiment.

FIG. 18 illustrates an example of scanning with laser light in the horizontal direction according to the present embodiment.

In FIG. 18, in a case where the road surface on which the vehicle VC traveling is flat, the optical axes OP(4, 1), OP(4, 2), OP(4, 3), . . . are included in a plane parallel to the road surface. That is, the laser light along the optical axes OP(4, 1), OP(4, 2), OP(4, 3), . . . is not intended to reach the road surface, but to be emitted in the forward direction of travel of the vehicle VC.

In FIG. 18, the optical axes OP(4, p−4), OP(4, p−3), OP(4, p+3), OP(4, p+4) are in the emission pattern of laser light for the first distance measurement range. The emission pattern of laser light for the first distance measurement range aims to emit laser light at equally spaced intervals around the future travel trajectory of the vehicle VC. That is, the emission pattern of laser light for the first distance measurement range aims to emit laser light at equally spaced intervals on the search plane Ss that is set at the search distance L.

Figure 19:
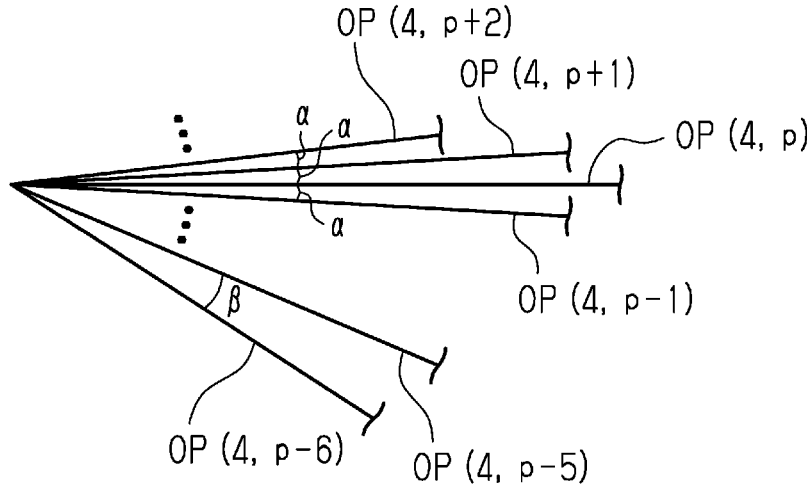
FIG. 19 is illustration of an example of emission angles implementing the emission pattern according the fifth embodiment.

As illustrated in FIG. 19, in the emission pattern of laser light for the first distance measurement range according to the present embodiment, the angle difference between the optical axes OP adjacent to each other in the horizontal direction is uniformly set to an angle difference $\alpha$. This is in consideration of the fact that the angle between the normal direction of the search plane Ss and each of the optical axes OP(4, p−4) to OP(4, p+4) is small, so that even if angle differences between optical axes OP adjacent to each other are uniformly the same, the laser light is allowed to reach the search plane Ss at equally spaced intervals with satisfactory accuracy. That is, the arrival positions A, B, . . . , I of the laser light traveling along the respective optical axes OP(4, p−4), OP(4, p−3), OP(4, p+3), and OP(4, p+4) on the search plane Ss are equally spaced with sufficient accuracy.

In the emission pattern of laser light for the second distance measurement range, the angle difference between each pair of adjacent optical axes OP is uniformly set to an angle difference that is greater than the angle difference $\alpha$.

Returning to FIG. 17, the CPU 22 performs the process steps S30 and S32, and based on a result of the process step S32, determines whether an obstacle or a preceding vehicle has been detected a predefined number or more of times during a predefined period (at S37b). If the CPU 22 determines that an obstacle or a preceding vehicle has been detected the predefined number or more of times during the predefined period ("YES" branch of S37b), the CPU 22 notifies the ADAS ECU 50 that an obstacle or a preceding vehicle has been detected (at S38).

Upon completion of the process step S38 or the answer being "NO" at S37b, the CPU 22 terminates the process flow illustrated in FIG. 17.

Although only the horizontal scanning process has been described in the present embodiment, the vertical scanning process may be the same as in the first or other embodiments.

Sixth Embodiment

A sixth embodiment is similar in basic configuration to the first embodiment. Thus, duplicate description regarding the common configuration will be omitted and differences from the fifth embodiment will be mainly described below.

In the present embodiment, a mode is used in which laser light is emitted to detect an obstacle or the like when the vehicle VC is parked in a parking lot.

Figure 20:
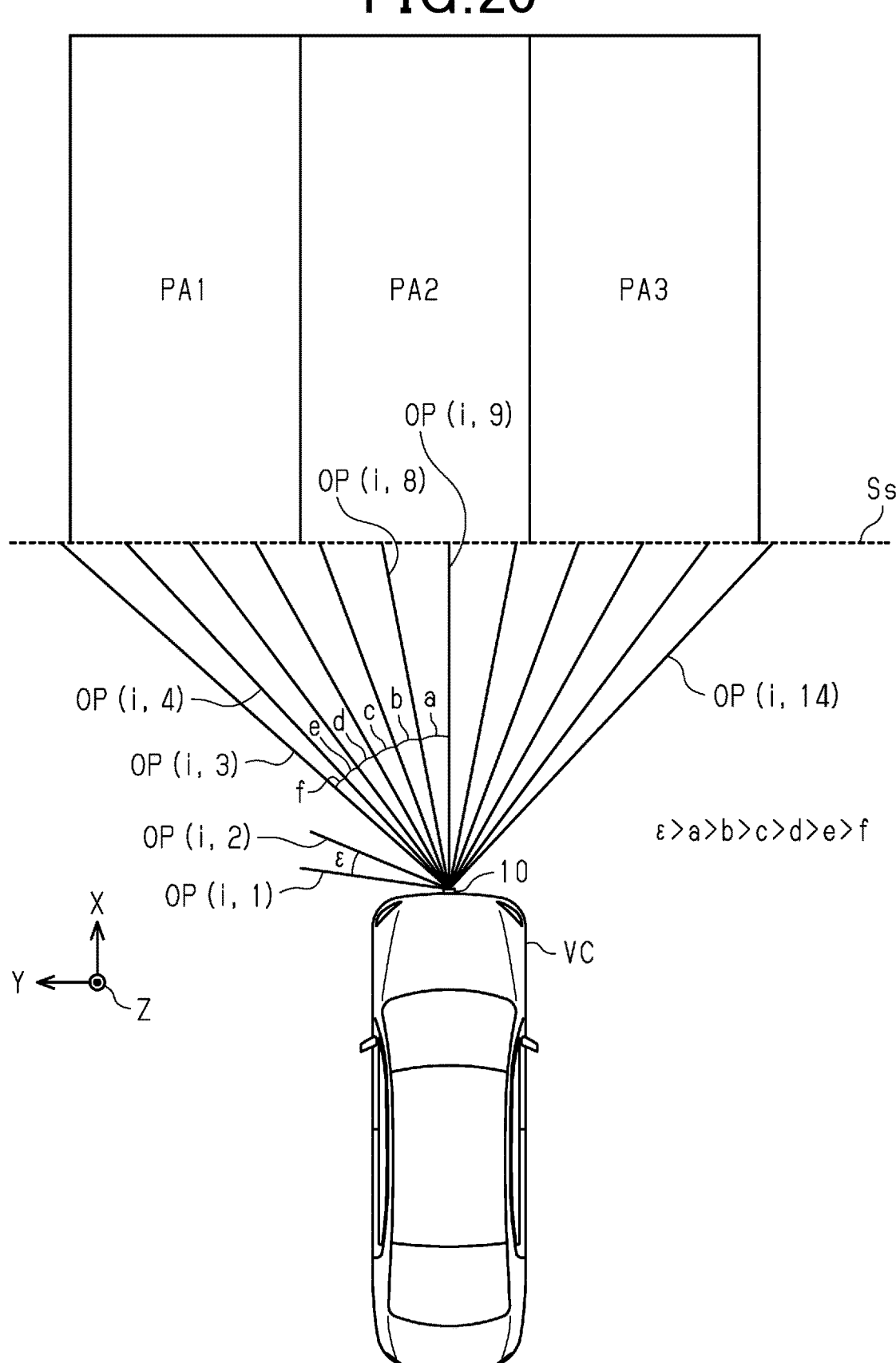
FIG. 20 is illustration of an example of an emission pattern according a sixth embodiment.

FIG. 20 illustrates an example of the emission pattern of laser light in the present embodiment. FIG. 20 illustrates an example where there are three parking spaces PA1, PA2, and PA3 in front of the vehicle VC, and the vehicle VC is moving toward the parking spaces PA1, PA2, and PA3. In the example illustrated in FIG. 20, a situation is assumed where detection of parking spaces PA1, PA2, and PA3 has been completed and a final monitoring process is being performed to determine whether each parking space is free of an obstruction or the like. The search plane Ss is set by the CPU 22 to cover the edges of the parking spaces PA1, PA2, PA3.

FIG. 20 illustrates optical axes OP(i, 3), OP(i, 4), . . . , OP(i, 14) according to the emission pattern of laser light for the first distance measurement range. The optical axes OP(i, 9), OP(i, 8), and OP(i, 7) correspond to first, second, and third directions, respectively. In the emission pattern of laser light for the first distance measurement range, the angle difference $\alpha$ between the optical axis OP (i, 9), which has the smallest angle with respect to the direction perpendicular to the search plane Ss, and the optical axis OP (i, 8) adjacent to the optical axis OP (i, 9) is a maximum angle difference among angle differences between optical axes OP adjacent to each other. That is, for example, in the emission pattern of laser light for the first distance measurement range, the angle difference a is greater than an angle difference f between the optical axis OP (i, 3), which has the smallest angle with respect to the positive Y-direction, and the optical axis OP (i, 4) adjacent to the optical axis OP (i, 3). This is a setting to ensure that arrival positions of laser light along the respective optical axes OP on the search plane Ss are equally spaced in the horizontal direction. That is, in the present embodiment, due to a large angle difference between the optical axes OP(i, 9) and OP(i, 3), fixed angle differences between the optical axes adjacent to each other may likely lead to large variations in spacings between the positions where the laser light traveling along the optical axes OP(i, 3), OP(i, 4), . . . , OP(i, 14) reaches the search plane Ss.

During a period in which the search plane Ss is fixed regardless of movement of the vehicle VC, the tracking mode set forth above is used. That is, variations in arrival positions of the laser light traveling along the optical axes OP on the search plane Ss are suppressed by increasing the angle differences a, b, . . . as the vehicle VC moves forward. In a case where the distance between the edge of each of the parking spaces PA1, PA2, PA3 and the vehicle VC is less than or equal to a predefined distance, the CPU 22 gradually shifts the search plane Ss in the direction of the depth of the parking spaces. In such a case, the CPU 22 increases the search distance L that is the distance between the search plane Ss and the vehicle VC when the vehicle speed SPD is high as compared to when the vehicle speed SPD is low.

OTHER EMBODIMENTS

The specific embodiments set forth above may be implemented with the following modifications. The specific embodiments set forth above and the following modifications may be implemented in combination with each other to the extent that they are technically consistent.

Regarding the Decreasing Process (M1) The density increasing process of increasing the number of emissions of laser light per frame and the frame rate increasing process of increasing the number of frames per unit time are performed by performing the decreasing process of decreasing the amount of emission energy of laser light per range point. Note that this is not essential. For example, even if either or both of the density increasing process and the frame rate increasing process are not performed, it is effective in decreasing the energy consumption rate to perform the decreasing process in light of the fact that the field of view to pay attention to is a near field when the vehicle speed SPD is low.

Regarding the Search Plane (M2) In the above embodiment, the search plane Ss is a plane perpendicular to the road surface. In an alternative embodiment, unless the slope of the road surface is excessively large, a plane along the vertical direction may be used as the search plane.

(M3) In the first to third embodiments set forth above, in a case where no object obstructing travel of the vehicle or no preceding vehicle has been detected, the search distance L is continuously changed in proportion to the vehicle speed SPD. In an alternative embodiment, for example, the search distance L may be set to a discrete value. More specifically, the search distance L may be set to any one of a plurality of values, such as 50 m, 100 m, 150 m, and 200 m, according to the vehicle speed SPD. Note that the process of changing the search distance L according to the vehicle speed SPD is not essential.

(M4) FIG. 4 illustrates an example of extending the search plane Ss to a lane other than the lane of travel (that is, the lane in which the own vehicle is traveling) only when making a lane change. In an alternative embodiment, the search plane Ss may be provided in each of all lanes in the same direction of travel at all times.

Regarding the Search Region (M5) In the fourth embodiment set forth above, in a case where the curvature of the road surface is greater than zero, it is sufficient to set the search region As along the curve of the road surface. In an alternative embodiment, the search region As may be set by approximating the curve of the road surface with a straight line. In an alternative embodiment, instead of setting the search region As on the road surface, the search region As may be set at a position slightly higher than the road surface.

(M6) In the fourth embodiment set forth above, in a case where no road markings have been detected, the distance between the center of the search region As and the vehicle VC is continuously changed in proportion to the vehicle speed SPD. In an alternative embodiment, for example, the distance Ls may be set to a discrete value. More specifically, the distance Ls may be set to any one of a plurality of values, such as 50 m, 100 m, 150 m, and 200 m, according to the vehicle speed SPD. Note that the process of changing the distance Ls according to the vehicle speed SPD is not essential.

Regarding the Tacking Mode (M7) In the fourth embodiment set forth above, the process of fixing the search region As is exemplified as the tracking mode. In this embodiment, it is not essential to fix the arrival positions of the laser light traveling along the optical axes OP on the road surface. In an alternative embodiment, for example, the arrival positions of the laser light traveling along the optical axes OP in the search region As where a road marking has been detected may be changed for each frame.

(M8) The tracking mode is not limited to those performed by being triggered by the LIDAR ECU 20 detecting a target. For example, the tracking mode may be performed when the ADAS ECU 50 issues a command to perform the tracking mode for a given region.

(M9) It is not essential to perform the tracking mode in the above embodiments.

Regarding the Road Surface Information Acquisition Process (M10) In the above embodiments, the road surface information includes the location data Dgps and the map data 46. In an alternative embodiment, for example, a road surface condition in the forward direction of travel based on image data captured by a camera or information about the slope of the road surface on which the vehicle is traveling based on acceleration sensor readings or the like may be acquired.

Regarding the Resolution Adjustment Process (a) Regarding the Vertical Scanning Case (M11) In the first to fourth embodiments set forth above, four directions having different angles with respect to the vertically upward direction are exemplified as the emission directions of laser light emitted to a region having the resolution to be increased. In an alternative embodiment, for example, there may be five or more directions having different angles with respect to the vertically upward direction. In an alternative embodiment, for example, there may be three directions having different angles with respect to the vertically upward direction. In an alternative embodiment, for example, there may be two directions having different angles with respect to the vertically upward direction.

(M12) In the first to third embodiments set forth above, the specified value Lh that is the distance between the arrival position D on the search plane Ss, of the laser light traveling in the emission direction having the smallest angle with respect to the vertically upward direction, among emission directions of laser light emitted to a region having the resolution to be increased, and the road surface 70 is less than or equal to the distance between the laser light emission position of the optical sensor 10 and the road surface 70. For example, the specified value Lh may be less than or equal to the outer diameter of tires, or may be less than or equal to a predefined value of 1 m or less, such as 50 cm or less.

(M13) In the first to third embodiments set forth above, for arrival positions A, B, C, and D on the search plane Ss, of the laser light traveling along the optical axes OP toward a region having the resolution to be increased, the distance between the road surface and the arrival position A, the distance between the arrival positions A and B, the distance between the arrival positions B and C, and the distance between the arrival positions C and D are the same. The distances between arrival positions adjacent to each other need only be set to meet the required resolution. In order to efficiently meet the resolution requirement with limited laser light resources, instead of making the angle differences between adjacent optical axes in the vertical direction equal to each other, it is effective to make them unequal in the manner described in the above embodiments.

Note that, in order to meet the resolution requirement, it is not essential to make the angle differences between optical axes adjacent to each other unequal in the vertically upward direction. Even in such a case, increasing the emission density of laser light in the first distance measurement range as compared to the emission density of laser light in the second distance measurement range is effective for detecting low-profile objects.

(M14) In FIG. 3, the resolution adjustment process is performed to monitor the presence or absence of low-profile objects forward in the lane in which the vehicle is traveling, provided that no object obstructing travel of the vehicle or no preceding vehicle is detected. For example, immediately after a vehicle traveling in a lane adjacent to the lane in which the own vehicle is traveling has passed the own vehicle, the process of tracking the vehicle that has passed the own vehicle and the resolution adjustment process for monitoring the presence or absence of low-profile objects forward in the lane in which the own vehicle is traveling may be performed in a time-shared manner.

(M15) In FIG. 3, a process for monitoring the presence or absence of a low-profile object that is not capable of operating on its own is illustrated as a process for increasing the resolution in a given region on vertically downward side, i.e., in the negative z-direction. In an alternative embodiment, for example, the above process may be for detecting the presence of children or the like. In such a case, the above specified value Lh may be about an average height of children.

(M16) FIG. 14 illustrates an example of the process where arrival positions of laser light are equally spaced on the road surface to detect road markings. In an alternative embodiment, for example, laser light may be emitted such that arrival positions of laser light are equally spaced on the road surface to detect low-profile objects.

(b) Regarding the Horizontal Scanning Case (M17) FIG. 17 illustrates the example of the process where, in the emission pattern of laser light for the first distance measurement range, the angle differences between the optical axes OP in the horizontal direction are smaller than in the emission pattern of laser light for the first distance measurement range, but are equal to each other.

(c) Others (M18) For example, in the first to fourth embodiments, the emission pattern of laser light in the fifth embodiment or its modification may be applied to the emission pattern of laser light for the first distance measurement range in the horizontal direction.

Regarding Optical Sensor (M19) In the above embodiments, the sensor for measuring distances by the FMCW method is exemplified as the optical sensor 10. In an alternative embodiment, for example, the optical sensor 10 may be a sensor for measuring distances by the Time-of-Flight (TOF) method.

(M20) The number of optical axes in the vertical direction is not limited to eight that is the number optical axes described in the above embodiments. For example, the number of optical axes in the vertical direction may be seven or nine. It is not essential that the number of optical axes in the vertical direction be one digit.

(M21) In the above embodiments, the laser light emission direction is changed by means of a phased array. In an alternative embodiment, for example, the laser light emission direction may be changed by a microelectromechanical system (MEMS) mirror.

Figure 21:
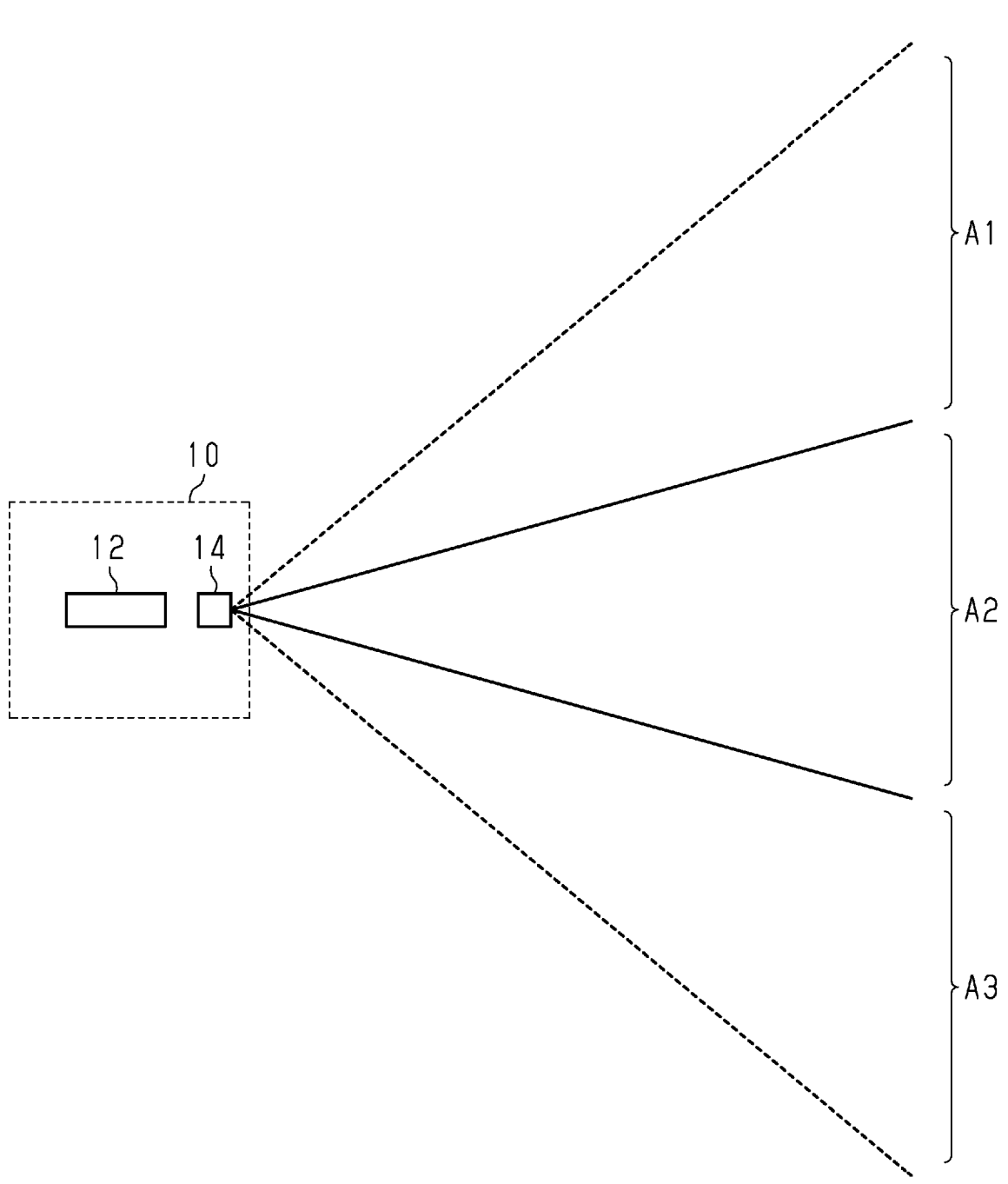
FIG. 21 illustrates an example of a modification to the sixth embodiment.

(M22) The devices that can change the laser light emission direction by the phased array are not limited to those that change the laser light emission direction by phased array only. For example, as illustrated in FIG. 21, the optical sensor 10 may include a device 14 that changes the direction of laser light output from a phased array device 12 configured to adjust the laser light emission direction by means of the phased array. In the example illustrated in FIG. 21, an irradiated area A2 is an area irradiated with the laser light in a case where the laser light emission direction is not changed by the device 14. The irradiated area is changed to irradiated areas A1 and A3 by the device 14 changing the laser light emission direction. This allows the laser light to be emitted to a wide area which can not be covered by the phased array alone. The devise 14 may be formed of photonic crystals or liquid crystals.

(M23) The optical sensor using the device 14 is not limited to the one illustrated in FIG. 21. For example, instead of the phased array device 12, a device including a light emitting element and the MEMS mirror may be used. Even in such a case, the device 14 may enlarge the field of view.

(M24) In the above embodiments, scanning with laser light in the vertical direction is implemented by the single optical sensor 10. In an alternative embodiment, for example, separate optical sensors may be provided that emit laser light along the respective optical axes OP(2$j$), OP(4$j$) and OP(3$j$), OP(5$j$). In other words, laser light emission directions that have different angles to each other with respect to the vertical direction in the emission pattern of laser light for the first distance measurement range may be implemented by a plurality of optical sensors. Even in such a case, instead of making the angle differences between adjacent optical axes equal to each other, it is effective to make them unequal in the manner described in the above embodiments in order to efficiently meet the resolution requirement with limited laser light resources.

Regarding the LIDAR ECU (M25) The LIDAR ECU is not limited to those including the CPU and the ROM to perform software processing. For example, at least part of what is software processed in the above embodiments may be provided in a dedicated hardware circuit (e.g., ASIC or the like) that performs hardware processing. That is, the LIDAR ECU may be in any one of the following configurations (a) through (c).

(a) The LIDAR ECU includes a processing unit that executes all of the above processes according to a program, and a program storage device, such as a ROM, that stores the program.

(b) The LIDAR ECU includes a processing unit that executes some of the above processes according to a program and a program storage unit, as well as a dedicated hardware circuit that executes the rest of the processes.

(c) The LIDAR ECU includes a dedicated hardware circuit that performs all of the above processes. There may be a plurality of software execution devices each including the processing unit and the program storage device, or a plurality of the dedicated hardware circuits.

Regarding the LIDAR Device (M26) The division of roles between the LIDAR ECU 20 and the optical sensor 10 in the LIDAR device is not limited to those illustrated in the above embodiments. In an alternative embodiment, for example, the LIDAR ECU 20 may receive signals received at the optical sensor 10, and the LIDAR ECU 20 may generate range point data based on these signals.

(M27) In the above embodiments, the optical sensor 10 and the LIDAR ECU 20 are separate devices that are communicable with each other. In an alternative embodiment, the optical sensor 10 and the LIDAR ECU 20 may be integrated into a single device.

(M28) The division of roles between the LIDAR ECU 20 and the ADAS ECU 50 is not limited to those exemplified in the above embodiments. In an alternative embodiment, for example, the ADAS ECU 50 may perform the determination process of determining the presence of low-profile objects.

(M29) In an alternative embodiment, the LIDAR ECU 20 and the ADAS ECU 50 may be integrated as a single device.

Regarding the Notification Process (M30) In the above embodiments, a process of outputting audio information via the speaker 60 is exemplified as the notification process of providing a notification that there is a low-profile object. In an alternative embodiment, for example, a process of outputting visual information by operating a display device, such as a head-up display or the like, may be used as the notification process.

Regarding Driving Assistance Processing (M31) Driving assistance processing is not limited to the notification process of providing a notification of the presence of a low-profile object or the like. For example, a deceleration process in which a brake actuator is operated may be used as driving assistance processing. The prescribed electronic device for driving assistance is not limited to a notification device or a brake actuator, but may also be, for example, a drive-train system. This may be implemented, for example, by limiting output of the on-board prime mover.

Regarding the ADAS ECU (M32) In the above embodiments, the result of recognition of low-profile objects by the LIDAR ECU 20 is the final recognition result to be received as input for driving assistance processing. In an alternative embodiment, for example, the final recognition result to be received as input for driving assistance processing may be generated together with recognition results based on image data from cameras, millimeter wave radar, and sonar or the like.

Although the present disclosure has been described in accordance with the above-described embodiments, it is not limited to such embodiments and structures, but also encompasses various variations and variations within equal scope. In addition, various combinations and forms, as well as other combinations and forms, including only one element, more or less, thereof, are also within the scope and idea of the present disclosure.

What is claimed is:

1. A LIDAR device that receives reflected light of laser light emitted to surroundings of a vehicle, the LIDAR device being configured to perform an emission process of emitting the laser light to the surroundings of the vehicle, wherein the emission process comprises a scanning process of scanning a plurality of emission directions of the laser light and a resolution adjustment process, the scanning process comprises a process of scanning with the laser light a predefined direction that is one of vertical and horizontal directions, the plurality of emission directions comprise, as four directions, a first direction and a second direction which are adjacent to each other in the predefined direction, and a third direction and a fourth direction adjacent to each other in the predefined direction, and the resolution adjustment process comprises a process of making an angle difference between the third and fourth directions less than an angle difference between the first and second directions, and a variably setting process of variably setting the angle difference between the third and fourth directions according to a state variable indicating a state of the vehicle, as an input.

2. The LIDAR device according to claim 1, wherein the LIDAR device is configured to perform a vehicle speed acquisition process of acquiring a vehicle speed as the state variable, and the variably setting process comprises a process of decreasing the angle difference between the third and fourth directions when the vehicle speed acquired in the speed acquisition process is high as compared to when the vehicle speed is low.

3. The LIDAR device according to claim 2, wherein the LIDAR device is configured to perform the resolution adjustment process by being triggered by no object obstructing travel of the vehicle having been detected in the forward direction of travel of the vehicle.

4. The LIDAR device according to claim 1, wherein the variably setting process comprises a process of increasing the angle difference between the third and fourth directions as a distance the vehicle travels forward as the state variable increases.

5. The LIDAR device according to claim 1, wherein the predefined direction is the vertical direction, an angle between a vertically upward direction and the first direction is less than an angle between the vertically upward direction and the fourth direction, and the third and fourth directions are directions in which the laser light is emitted to a road surface.

6. The LIDAR device according claim 5, wherein the LIDAR device is configured to perform a vehicle speed acquisition process of acquiring a vehicle speed as the state variable, and the resolution adjustment process comprises a process of increasing a distance between the vehicle and a point where the laser light emitted in the third direction reaches the road surface and a distance between the vehicle and a point where the laser light emitted in the fourth direction reaches the road surface when the vehicle speed is high as compared to when the vehicle speed is low.

7. The LIDAR device according claim 5, wherein a number of emission directions of the laser light in the vertical direction is equal to or less than 10, and a difference between arrival positions of the laser light emitted in the third and fourth directions on a plane perpendicular to the road surface 50 m or more ahead of the vehicle is equal to or less than 20 cm.

8. The LIDAR device according claim 7, wherein the LIDAR device is configured to perform a determination process of determining that there is an object likely to obstruct travel of the vehicle, provided that at least two beams of the laser light emitted toward the road surface are reflected by an object outside of the vehicle and then received.

9. The LIDAR device according to claim 5, wherein the scanning process comprises a process of scanning with the laser light three or more emission directions vertically downward of the first and second directions, an angle difference in a scanning direction between two adjacent directions, of the three or more emission directions, being less than an angle difference in the scanning direction between the first and second directions, the three or more directions comprise a fifth direction, a sixth direction, and a seventh direction, the fifth, sixth, and seventh directions are directions in which the laser light is emitted to the road surface, the fifth and sixth directions are the third and fourth directions, and the sixth and seventh directions are adjacent to each other in the vertical direction, and the resolution adjustment process comprises a process of setting an angle difference in the scanning direction between the fifth and sixth directions and an angle difference in the scanning direction between the sixth and seventh directions to different values.

10. The LIDAR device according claim 9, wherein an angle between the seventh direction and the vertically upward direction is less than an angle between the fifth direction and the vertically upward direction, and the resolution adjustment process comprises a process of decreasing an angle difference in the scanning direction between the sixth and seventh directions as compared to an angle difference in the scanning direction between the fifth and sixth directions.

11. The LIDAR device according claim 9, wherein the LIDAR device is configured to perform a vehicle speed acquisition process of acquiring a vehicle speed, and the resolution adjustment process comprises:

a process of increasing a distance between the vehicle and a point where the laser light emitted in the third direction reaches the road surface and a distance between the vehicle and a point where the laser light emitted in the fourth direction reaches the road surface when the vehicle speed acquired in the vehicle speed acquisition process is high as compared to when the vehicle speed is low;

a decreasing process of decreasing an amount of emission energy of laser light per range point when the distances are small as compared to when the distances are large; and a density increasing process of increasing a number of emissions of laser light emitted in the three or more directions per frame when the distances are small as compared to when the distances are large.

12. The LIDAR device according to claim 5, wherein the LIDAR device is configured to perform a vehicle speed acquisition process of acquiring a vehicle speed, and the resolution adjustment process comprises:

a process of increasing a distance between the vehicle and a point where the laser light emitted in the third direction reaches the road surface and a distance between the vehicle and a point where the laser light emitted in the fourth direction reaches the road surface when the vehicle speed acquired in the vehicle speed acquisition process is high as compared to when the vehicle speed is low;

a decreasing process of decreasing an amount of emission energy of laser light per range point when the distances are small as compared to when the distances are large; and a frame rate increasing process of increasing a number of frames per unit time when the distances are small as compared to when the distances are large.

13. The LIDAR device according to claim 1, wherein the predefined direction is the horizontal direction, the scanning process comprises a process of scanning with the laser light three or more directions, an angle difference in the scanning direction between two adjacent directions in the scanning direction, of the three or more directions, is less than an angle difference in the scanning direction between the first and second directions, the three or more directions comprise a fifth direction, a sixth direction, and a seventh direction, the fifth and sixth directions are the third and fourth directions, the sixth and seventh directions are adjacent to each other in the scanning direction, and the resolution adjustment process comprises a process of setting an angle difference in the scanning direction between the fifth and sixth directions and an angle difference in the scanning direction between the sixth and seventh directions to different values.

14. The LIDAR device according claim 13, wherein an angle between the fifth direction and a longitudinal direction of the vehicle is less than an angle between the seventh direction and the longitudinal direction of the vehicle, and the resolution adjustment process comprises a process of decreasing an angle difference in the scanning direction between the sixth and seventh directions as compared to an angle difference in the scanning direction between the fifth and sixth directions.

15. The LIDAR device according claim 14, wherein an angle between the first direction and the longitudinal direction of the vehicle is greater than an angle between the third direction and the longitudinal direction of the vehicle.

* * * * *